(12) United States Patent
Vagharshakian et al.

(10) Patent No.: US 12,309,456 B2
(45) Date of Patent: May 20, 2025

(54) ARTIFICIAL INTELLIGENCE APPROACHES FOR PREDICTING CONVERSION ACTIVITY PROBABILITY SCORES AND KEY PERSONAS FOR TARGET ENTITIES

(71) Applicant: Adobe Inc., San Jose, CA (US)

(72) Inventors: Liana Vagharshakian, San Francisco, CA (US); Atanu R. Sinha, Bangalore (IN); Camille Girabawe, Nashville, TN (US); Gautam Choudhary, Sri Ganganagar (IN); Omar Rahman, San Jose, CA (US); Scott Trafton, Ewa Beach, HI (US); Vivek Sinha, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1021 days.

(21) Appl. No.: 17/339,700

(22) Filed: Jun. 4, 2021

(65) Prior Publication Data
US 2022/0394337 A1 Dec. 8, 2022

(51) Int. Cl.
*G06N 3/04* (2023.01)
*H04N 21/258* (2011.01)
(Continued)

(52) U.S. Cl.
CPC .......... *H04N 21/4666* (2013.01); *G06N 3/04* (2013.01); *H04N 21/25891* (2013.01); *H04N 21/4532* (2013.01); *H04N 21/4661* (2013.01); *H04N 21/4667* (2013.01); *G06N 3/047* (2023.01); *G06N 7/01* (2023.01); *G06N 7/046* (2013.01)

(58) Field of Classification Search
CPC ......... H04N 21/4666; H04N 21/25891; H04N 21/4532; H04N 21/4661; H04N 21/4667; G06N 3/04; G06N 3/047; G06N 7/01; G06N 7/046; G06N 3/0442; G06N 3/045; G06N 3/0464; G06N 3/0475; G06N 3/094;
(Continued)

(56) References Cited

U.S. PATENT DOCUMENTS 11,144,185 B1 * 10/2021 Dinga ................... G06F 3/0482
2011/0231224 A1 * 9/2011 Winters ................. G06Q 30/06
705/7.29
(Continued)

*Primary Examiner* — Hope C Sheffield
(74) *Attorney, Agent, or Firm* — Keller Preece PLLC

(57) ABSTRACT

The present disclosure relates to systems, methods, and non-transitory computer readable media for accurately and efficiently predicting conversion probability scores and key personas for target entities utilizing an artificial intelligence approach. For example, the disclosed systems utilize a conversion activity score neural network to predict conversion activity probability scores for target entities and utilize a persona prediction machine learning model to predict key personas associated with target entities. In particular, the disclosed systems utilize the conversion activity score neural network to generate a predicted conversion activity probability score for a target entity from input data including client device interactions of digital profiles belonging to the target entity as well as an entity feature vector representing characteristics of the target entity. The disclosed systems also (or alternatively) utilize a persona prediction machine learning model to determine a set of key personas for the target entity from the entity feature vector.

20 Claims, 14 Drawing Sheets

(51) Int. Cl.
   *H04N 21/45*    (2011.01)
   *H04N 21/466*   (2011.01)
   *G06N 3/047*    (2023.01)
   *G06N 7/01*     (2023.01)
   *G06N 7/04*     (2006.01)

(58) Field of Classification Search
   CPC ........... G06Q 30/0201; G06Q 30/0251; G06Q 30/0282; G06Q 30/0631
   See application file for complete search history.

(56)            References Cited

U.S. PATENT DOCUMENTS

2016/0189246 A1*  6/2016  Eldh ................. G06Q 30/0269
                                                       705/14.66
2019/0327331 A1* 10/2019  Natarajan ............ G06F 40/274
2020/0118029 A1*  4/2020  DeBraal ............. G06Q 30/0201
2021/0350202 A1* 11/2021  Zachariah ............ G06Q 30/02

* cited by examiner

ARTIFICIAL INTELLIGENCE APPROACHES FOR PREDICTING CONVERSION ACTIVITY PROBABILITY SCORES AND KEY PERSONAS FOR TARGET ENTITIES

BACKGROUND

Recent developments in hardware and software platforms have led to innovations in systems and methods for distributing digital content to target entities. For example, engineers have developed some conventional targeted digital content systems that utilize analytical approaches to distribute digital content at particular times and to particular devices based on historical distribution patterns and results. Despite these advances, however, many conventional targeted digital content systems continue to demonstrate a number of deficiencies or drawbacks, particularly in accuracy, efficiency, and flexibility.

As suggested, many conventional targeted digital content systems inaccurately identify devices and/or entities to distribute digital content. Indeed, by relying on information indicating historical performance of digital content distributed to particular devices and/or entities at particular times, conventional systems often determine an incomplete, backward-looking view of what content distribution has worked in the past. Because they are backward-looking in this sense, these conventional systems cannot always account for updated circumstances that impact the effectiveness of content distribution with respect to a particular campaign, such as changes that have occurred within the target entities themselves and/or changes relative to devices associated with the target entities. Therefore, conventional systems are frequently inaccurate in selecting recipients for and/or types of distributed digital content, often distributing (or causing to be distributed) ineffective digital content to devices or profiles that play little or no part in decision making for the target entity.

Due at least in part to their inaccuracy, many conventional targeted digital content systems are also inefficient. Indeed, as mentioned, their inaccuracy in determining recipient devices for digital content leads some conventional systems to distribute (or cause digital content providers to distribute) digital content to devices that will not or cannot take any actions relative to a target entity. As a result, conventional systems often inefficiently generate and distribute excessive numbers of wasted digital content items, consuming computing resources such as processing power and memory that could otherwise be preserved.

As another example of their inefficiency, some conventional targeted digital content systems provide inefficient user interfaces. To elaborate, the user interfaces provided for display by conventional systems often require excessive numbers of client device interactions to navigate to desired data and/or functionality. More specifically, some conventional systems require navigating between multiple applications and/or between multiple user interfaces, through many different layers, to access data and functionality pertinent to distributing digital content to a target entity. For example, some conventional user interfaces are designed to facilitate distribution of digital content to particular digital profiles, while other conventional interfaces are designed to indicate characteristics of digital profiles that an administrator can analyze to come up with a content distribution strategy. Thus, to gain a complete picture of a digital content campaign, conventional systems require multiple user interfaces and sometimes require large numbers of client device interactions to navigate between these multiple interfaces to access the necessary data and/or functionality.

Furthermore, conventional systems are also inflexible. For example, conventional systems often rigidly focus distribution of digital content at an individual level (e.g., at the level of individual client devices or corresponding users). This inflexible approach exacerbates the inaccuracies and inefficiencies discussed above. Indeed, by focusing analysis on individual client devices, conventional systems fail to recognize inter-relationships and exchanges among client devices/individuals within the same entity and therefore inaccurately and inefficiently distribute digital content across computer networks.

Thus, there are several disadvantages with regard to conventional targeted digital content systems.

SUMMARY

This disclosure describes one or more embodiments of systems, methods, and non-transitory computer readable media that solve one or more of the foregoing or other problems in the art with an artificial intelligence approach for predicting conversion probability scores and key personas for target entities. In some cases, the disclosed systems utilize a conversion activity score neural network to predict conversion activity probability scores for target entities. In these or other cases, the disclosed systems utilize a persona prediction machine learning model to predict key personas associated with target entities. For example, the disclosed systems utilize the conversion activity score neural network to generate a predicted conversion activity probability score for a target entity from input data including client device interactions of digital profiles belonging to the target entity as well as an entity feature vector representing characteristics of the target entity. In some embodiments, the disclosed systems also (or alternatively) utilize a persona prediction machine learning model to determine a set of key personas for the target entity from the entity feature vector. In these or other embodiments, the disclosed systems also provide an entity conversion activity interface for display on an administrator device to present a conversion activity probability score together with a representation of the key personas for the target entity. By presenting the conversion activity probability score and the key personas together, the disclosed systems provide an efficient user interface. Additionally, by utilizing the conversion activity score neural network and the persona prediction machine learning model, the disclosed systems accurately select recipients for digital content as part of a digital content campaign.

In one or more embodiments, the disclosed systems orchestrate distribution of digital content to a target entity and/or various administrator devices. For example, the disclosed systems provide a specific journey interface for distributing digital content based on specific conditions relative to the target entity as a whole, rather than distributing content based on characteristics of individual digital profiles. In certain cases, the disclosed systems provide the entity journey interface to include elements selectable for adding certain distribution conditions and corresponding distribution actions that are performed upon satisfaction of the conditions. As an example, the disclosed systems determine (as a condition) that a conversion activity probability score of a target entity satisfies a threshold and therefore cause (as a corresponding action) a content distribution system to provide a particular type of digital content to one or more digital profiles of the target entity.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
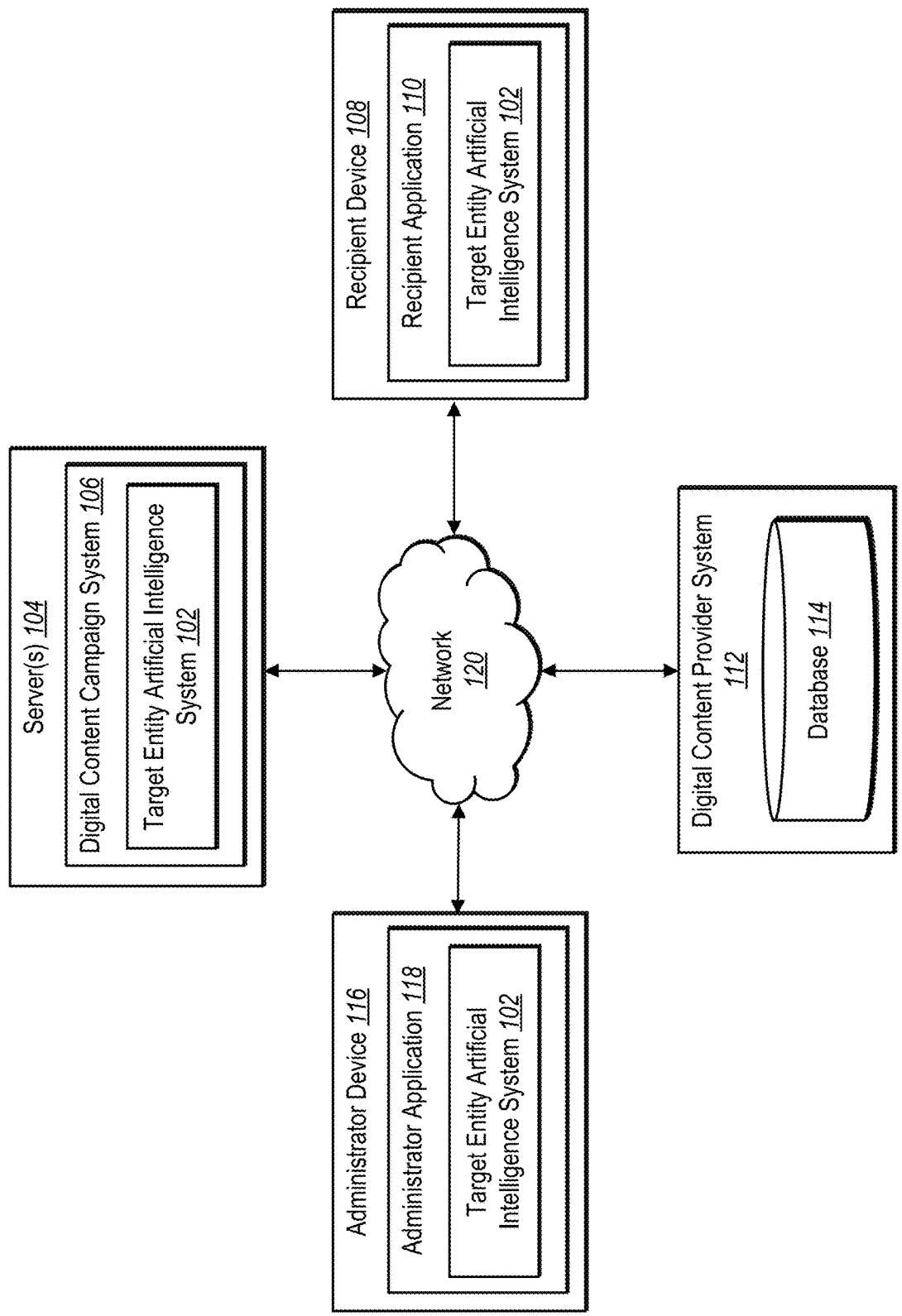
FIG. 1 illustrates an example system environment in which a target entity AI system operates in accordance with one or more embodiments.

This disclosure describes one or more embodiments of a target entity artificial intelligence ("AI") system that accurately and efficiently generates conversion activity probability scores and key personas for target entities. In particular, in some embodiments, the target entity AI system generates a conversion activity probability score by utilizing a conversion activity score neural network to analyze or process client device interactions and an entity feature vector. In the same or different embodiments, the target entity AI system determines key personas involved in decision making for the target entity by utilizing a persona prediction machine learning model to analyze or process various entity features.

In certain cases, the target entity AI system also (or alternatively) orchestrates digital content distribution to the target entity based on various content distribution conditions relating to the conversion activity probability score and/or the set of key personas associated with the target entity.

As just mentioned, in one or more embodiments, the target entity AI system generates a predicted conversion activity probability score for a target entity. For example, the target entity AI system generates a conversion activity probability score that indicates a likelihood or a probability that a target entity will perform a particular conversion activity. To generate the conversion activity probability score, in some cases, the target entity AI system utilizes a conversion activity score neural network to generate a predicted score based on particular input data. For instance, the input data includes an entity feature vector and one or more client device interactions from digital profiles associated with the target entity. Based on a conversion activity probability score for a target entity, the target entity AI system can perform certain entity-level actions to distribute digital content. Additional detail regarding generating a conversion activity probability score, including architecture details of the conversion activity score neural network, is provided below with reference to the figures.

As mentioned above, in some embodiments, the target entity AI system determines or generates key personas for a target entity. For example, the target entity AI system identifies key personas as personas relevant to decision making for the target entity from among a plurality of digital profiles associated with the target entity. In some cases, the target entity AI system identifies a number or a set of key personas for a given target entity by utilizing a persona prediction machine learning model. For instance, the target entity AI system utilizes the persona prediction machine learning model to analyze or process an entity feature vector representing characteristics of the target entity to generate a predicted set of key personas involved in conversion activity and/or modifying digital content for the target entity.

In one or more embodiments, the target entity AI system provides indications of the key personas and/or the conversion activity probability score for display on an administrator device. For example, the target entity AI system generates and provides an entity conversion activity interface for display on an administrator device associated with a digital content campaign system. In some implementations, the target entity AI system generates the entity conversion activity interface to include a conversion activity score element depicting the predicted conversion activity probability score (and/or a funnel stage within a displayed conversion activity funnel) together with a key persona element depicting the predicted key personas of the target entity.

In certain described embodiments, the target entity AI system further orchestrates distribution of digital content (e.g., distributed by a digital content provider) based on specific conditions relative to the target entity as a whole (as opposed to distributing digital content based on characteristics of individual digital profiles). For example, the target entity AI system provides an entity journey interface for display on an administrator device that includes condition elements selectable for adding content distribution conditions and that further includes content distribution elements selectable for adding content distribution actions corresponding to certain conditions. In response to user selection of a condition element, in certain embodiments, the target entity AI system generates a condition for the target entity such as a threshold conversion activity probability score or a change in a set of key personas. Based on determining that the condition is satisfied, in some cases, the target entity AI system performs an action to cause a digital content provider to distribute digital content corresponding to the condition.

For instance, the target entity AI system updates a conversion activity probability score for the target entity based on new client device interactions and determines that the updated conversion activity probability score satisfies a conversion activity probability threshold of a particular condition. Based on this determination, in some embodiments, the target entity AI system provides an indication to a digital content provider to distribute digital content to the target entity (e.g., to devices of key personas of the target entity).

As another example, the target entity AI system determines that a set of key personas for the target entity is incomplete. In some cases, the target entity AI system determines that the target entity includes a certain number (e.g., 5) key personas among its various internal roles or positions and further determines that only 4 of the 5 key personas is associated with a corresponding digital profile (e.g., the $5^{th}$ key persona is an empty key persona). In response to determining that the key personas are incomplete (e.g., include an empty key persona), in some embodiments, the target entity AI system causes a digital content provider to provide digital content to one or more digital profiles of the target entity in an effort to identify the $5^{th}$ key persona (e.g., to identify the digital profile associated with the $5^{th}$ key persona).

As suggested above, embodiments of the target entity AI system provide certain improvements or advantages over conventional targeted digital content systems. For example, embodiments of the target entity AI system improve accuracy over conventional systems. To elaborate, compared to conventional systems, embodiments of the target entity AI system more accurately identify or determine stages of target entities within a conversion activity funnel. Indeed, compared to the incomplete, back-ward looking view of many conventional systems, embodiments of the target entity AI system accurately determine funnel stages of target entities by utilizing a conversion activity score neural network to generate predicted conversion activity probability scores from current target entity characteristics and up-to-date client device interactions. As a result of more accurately determining funnel stages, embodiments of the target entity AI system also more accurately determine which types of digital content to recommend to which digital profiles to advance the target entity through additional funnel stages.

As just mentioned, certain embodiments of the target entity AI system improve accuracy over conventional systems in determining or selecting digital profiles as recipients for distributed digital content. More specifically, while many conventional systems distribute digital content to digital profiles that play little or no part in decision making for a target entity, embodiments of the target entity AI system determine key personas for the target entity utilizing a persona prediction machine learning model (e.g., to analyze an entity feature vector representing characteristics of the target entity). Thus, compared to conventional systems, the target entity AI system can more accurately determine, identify, or select recipient devices and/or recipient digital profiles that play a part in making decisions for a target entity.

Due at least in part to its improved accuracy over conventional systems, embodiments of the target entity AI system can also improve efficiency over conventional targeted digital content systems. For example, embodiments the of target entity AI system waste fewer computing resources in distributing (or causing a digital content provider to distribute) digital content compared to conventional systems. Indeed, while some conventional systems distribute (or cause to be distributed) digital content to devices or profiles that play little or no part in decision making for a target entity, the target entity AI system can identify key personas utilizing the persona prediction machine learning model (to process an entity feature vector representing characteristics of the target entity). Embodiments of the target entity AI system, therefore, identify recipient devices and/or recipient profiles for more efficient distribution of digital content, requiring fewer computing resources such as processing power and memory in generation and distribution of digital content.

As another example of improved efficiency, embodiments of the target entity AI system generate and provide more efficient user interfaces than conventional targeted digital content systems. For example, some conventional systems require navigating between multiple applications and/or between multiple user interfaces to access data and functionality pertinent to distributing digital content to a target entity. The target entity AI system, by contrast, can generate and provide a conversion activity interface that includes or presents data and/or functionally traditionally separated by many layers in entirely separate interfaces or applications (or not even available at all) in conventional systems. For instance, the conversion activity interface includes both a conversion activity score element depicting a conversion activity probability score (and a corresponding funnel stage) and a key persona element depicting key personas for the target entity together in the same, single interface. Thus, rather than requiring tedious back-and-forth navigation, the target entity AI system requires fewer client device interactions to access information regarding a status or funnel stage related to a target entity together with an indication of which digital profiles are most relevant for distributing digital content.

Furthermore, embodiments of the target entity AI system are more flexible than conventional systems. For example, in contrast to conventional systems that focus analysis at the individual/client device level, the target entity AI system can select and provide digital content based on analysis of computing devices corresponding to an entity as a whole. This flexibility allows the target entity AI system to consider inter-dependencies and trends among client devices to more flexibly, accurately, and efficiently provide digital content to client devices within an entity as a whole.

As suggested by the foregoing discussion, this disclosure utilizes a variety of terms to describe features and benefits of the target entity AI system. Additional detail is hereafter provided regarding the meaning of these terms as used in this disclosure. In particular, the term "target entity" refers to a group, body, organization, or entity. For example, a target entity can include a body or organization that includes a collection of multiple individuals (e.g., individuals represented by digital profiles) and that is the target of distributed digital content as part of a digital content campaign. For example, a target entity includes an account or an organization such as a company, a government body, or a school district that is targeted by a digital content campaign to motivate the target entity to perform one or more conversion activities. Relatedly, the term "conversion activity" refers to an activity performed by a target entity that is the aim of a digital content campaign. For example, a conversion activity includes an initial purchase of a product or service, an additional purchase of a related product or service, or an upgraded purchase of a product or service.

As mentioned, a target entity includes a collection of digital profiles associated with, or belonging to, the target entity. As used herein, the term "digital profile" refers to an online, network-based profile corresponding to a user or individual that is part of a target entity. A digital profile can include, or be associated with, various digital profile characteristics such as a profile name, a profile position within a target entity, a profile description, a description of responsibilities of the position of the digital profile, device identifications corresponding to the digital profile, communications sent and/or received, and IP addresses corresponding to the digital profile. A client device corresponding to a digital profile can perform, a "client device interaction" which refers to an action or activity corresponding to a digital profile in relation to digital content of a digital content campaign. For example, a client device interaction includes, among other things, a selection of a digital content item provided within an email or via a social networking website or a creation of an account within a digital content provider system.

As used herein, the term "digital content provider" refers to an entity that provides or distributes digital content to one or more target entities or client devices. For example, a digital content provider includes a company or organization that provides digital content to motivate a target entity to perform a conversion activity. Such "digital content" includes, but is not limited to, emails, website banners or other website content, posts or messages within social media platforms, and/or video segments provided via online streaming services with the aim of motivating a target entity to perform a conversion activity.

As mentioned above, the target entity AI system utilizes an artificial intelligence approach to determining conversion activity probability scores and key personas for a target entity. In some cases, artificial intelligence involves utilizing one or more machine learning models. As used herein, the term "machine learning model" refers to a computer algorithm or a collection of computer algorithms that automatically improve for a particular task through experience based on use of data. For example, a machine learning model can utilize one or more learning techniques to improve in accuracy and/or effectiveness. Example machine learning models include various types of neural networks, decision trees, support vector machines, and Bayesian networks.

In some embodiments, the target entity AI system utilizes a persona prediction machine learning model to determine or identify key personas associated with a target entity. As used herein, the term "persona prediction machine learning model" refers to a machine learning model that predicts or determines key personas associated with a target entity. For example, a persona prediction machine learning model accepts a set of target entity characteristics (or an entity feature vector representing the target entity characteristics) as input and generates from that input a set of one or more key personas. As suggested above, example persona prediction machine learning models include a neural network (e.g., a deep neural network), a support vector machine, Bayesian classifier, or a decision tree. Relatedly, the term "key persona" refers to a persona or position associated with (e.g., within) a target entity that are relevant to making decisions for the target entity. For example, a key persona includes a particular role within the target entity involved in making decisions on whether or not to perform a conversion activity for the target entity. In some cases, a key persona includes a target entity position for modifying digital content utilized by the target entity. Along these lines, an "empty key persona" refers to a key persona that is unaffiliated with (or is not assigned to) a corresponding digital profile of the target entity.

As mentioned above, the target entity AI system can utilize machine learning models, including one or more neural networks. As used herein, the term "neural network" refers to a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

Along these lines, the term "conversion activity score neural network" refers to a neural network that generates, determines, or predicts a conversion activity probability score for a target entity. For example, a conversion activity score neural network accepts various client device interactions and/or target entity features as input for generating a conversion activity probability score. As described in further detail below, in some cases, a conversion activity score neural network includes various layers such as attention layers and aggregation layers for generating various internal vectors such as interaction vectors and profile vectors as part of generating an output in the form of a conversion activity probability score. Relatedly, the term "conversion activity probability score" refers to a score that indicates a likelihood or a probability that a target entity will perform a particular conversion activity. For example, a conversion activity probability score can refer to a score on a particular scale (e.g., 1 to 100 or 1 to 10), where higher (or lower) scores indicate increases in likelihood that the target entity will perform the conversion activity.

As mentioned, in some embodiments, the target entity AI system generates and/or utilizes an entity feature vector via one or more machine learning models. As used herein, the term "entity feature vector" refers to a vector including one or more features of a target entity. For example, an entity feature vector includes features corresponding to observable characteristics of a target entity and/or unobservable (e.g., deep) features of the target entity. Example target entity characteristics that are encoded within an entity feature vector include, but are not limited to, a number of employees, a number of positions within the target entity, one or more geographic locations, internet traffic information (e.g., client device interactions, IP addresses of devices within the target entity that perform client device interactions, websites visited) of the target entity, an industry of the target entity, and/or a number of locations or offices.

As also mentioned, in certain embodiments, the target entity AI system determines funnel stages for a target entity within a conversion activity funnel. As used herein, the term "conversion activity funnel" refers to a set or a series of advancing stages corresponding to respective conversion activity probability scores and culminating with a conversion activity. Relatedly, the term "funnel stage" refers to a stage within a conversion activity funnel. For example, a conversion activity funnel can include multiple stages reflecting relationships of a target entity with a particular conversion activity (or with a digital content item or a product/service). In some cases, a conversion activity funnel starts with an awareness stage and ends with performance stage (e.g., performance of the conversion activity).

Additional detail regarding the target entity AI system will now be provided with reference to the figures. For example, FIG. 1 illustrates a schematic diagram of an example system environment for implementing a target entity AI system 102 in accordance with one or more embodiments. An overview of the target entity AI system 102 is described in relation to FIG. 1. Thereafter, a more detailed description of the components and processes of the target entity AI system 102 is provided in relation to the subsequent figures.

As shown, the environment includes server(s) 104, a recipient device 108, an administrator device 116, a digital content provider system 112, and a network 120. Each of the components of the environment communicate via the network 120, and the network 120 is any suitable network over which computing devices communicate. Example networks are discussed in more detail below in relation to FIG. 14.

As mentioned, the environment includes a recipient device 108. The recipient device 108 is one of a variety of computing devices, including a smartphone, a tablet, a smart television, a desktop computer, a laptop computer, a virtual reality device, an augmented reality device, or another computing device as described in relation to FIG. 14. Although FIG. 1 illustrates a single instance of the recipient device 108, in some embodiments, the environment includes multiple different recipient devices, each associated with a different user (e.g., a member or employee of a target entity). The recipient device 108 communicates with the server(s) 104 and/or the digital content provider system 112 via the network 120. For example, the recipient device 108 receives digital content from the digital content provider system 112 and provides information to server(s) 104 indicating client device interactions (e.g., views, clicks, or other input) with respect to the digital content. Thus, the target entity AI system 102 on the server(s) 104 receives information based on client device interaction via the recipient device 108.

As shown in FIG. 1, the recipient device 108 includes a recipient application 110. In particular, the recipient application 110 is a web application, a native application installed on the recipient device 108 (e.g., a mobile application, a desktop application, etc.), or a cloud-based application where all or part of the functionality is performed by the server(s) 104. The recipient application 110 presents or displays information to a user, including digital content provided as part of a digital content campaign.

As mentioned above, the environment includes an administrator device 116. The administrator device 116 is one of a variety of computing devices, including a smartphone, a tablet, a smart television, a desktop computer, a laptop computer, a virtual reality device, an augmented reality device, or another computing device as described in relation to FIG. 14. Although FIG. 1 illustrates a single instance of the administrator device 116, in some embodiments, the environment includes multiple different administrator devices, each associated with a different user (e.g., an administrator). The administrator device 116 communicates with the server(s) 104 via the network 120. For example, the administrator device 116 receives data from the server(s) 104 to display an entity conversion activity interface (e.g., via the administrator application 118) and provides data to the server(s) 104 in the form of user input via the administrator application 118. Thus, the target entity AI system 102 on the server(s) 104 receives information based on client device interaction via the administrator device 116.

As shown in FIG. 1, the administrator device 116 includes an administrator application 118. In particular, the administrator application 118 is a web application, a native application installed on the administrator device 116 (e.g., a mobile application, a desktop application, etc.), or a cloud-based application where all or part of the functionality is performed by the server(s) 104. The administrator application 118 presents or displays information to an administrator, including an entity conversion activity interface depicting a conversion activity probability score and/or a conversion activity funnel. For example, an administrator interacts with the administrator application 118 to provide user input to provide target entity journeys, funnel stages, key personas and/or conversion activity probability scores.

As further illustrated in FIG. 1, the environment includes a digital content provider system 112. In particular, the digital content provider system 112 generates, provides, and/or distributes digital content to target entities (e.g., to the recipient device 108). For example, the digital content provider system 112 communicates with the server(s) 104 and/or the administrator device 116 to identify or determine digital content to provide to particular digital profiles or recipient devices associated with a target entity. In some cases, the digital content provider system 112 utilizes a database 114 to store or maintain digital content for distribution to target entities.

As illustrated in FIG. 1, the environment includes the server(s) 104. The server(s) 104 generates, tracks, stores, processes, receives, and transmits electronic data, such as indications of client device interactions, digital profiles, entity feature vectors, conversion activity probability scores, and key personas. For example, the server(s) 104 receives data from the recipient device 108 in the form of an indication of a client device interaction to view digital content provided by the digital content provider system 112. In response, the server(s) 104 transmits data to the administrator device 116 to cause the administrator device 116 to: i) display or present a notification of the client device interaction within an entity conversion activity interface, ii) to update a conversion activity probability score, and/or iii) to update a set of key personas associated with a target entity corresponding to the recipient device 108.

In some embodiments, the server(s) 104 communicates with the recipient device 108 and/or the administrator device 116 to transmit and/or receive data via the network 120. In some embodiments, the server(s) 104 comprises a distributed server where the server(s) 104 includes a number of server devices distributed across the network 120 and located in different physical locations. The server(s) 104 can comprise a content server, an application server, a communication server, a web-hosting server, a multidimensional server, or a machine learning server.

As further shown in FIG. 1, the server(s) 104 also includes the target entity AI system 102 as part of a digital content campaign system 106. For example, in one or more implementations, the digital content campaign system 106 can store, generate, modify, edit, enhance, provide, distribute, and/or share digital content, such as digital images, emails, or digital videos. For example, the digital content campaign system 106 provide digital content as part of a digital content campaign for motivating a particular target entity to perform a conversion activity. In some implementations, the digital content campaign system 106 provides specific digital content to particular digital profiles (e.g., key personas) associated with a target entity.

In one or more embodiments, the server(s) 104 includes all, or a portion of, the target entity AI system 102. For example, the target entity AI system 102 operates on the server(s) to determine conversion activity probability scores (e.g., via a conversion activity score neural network) and to determine key personas (e.g., via a persona prediction machine learning model).

In certain cases, the recipient device 108 and/or the administrator device 116 includes all or part of the target entity AI system 102. For example, the recipient device 108 and/or the administrator device 116 can generate, obtain (e.g., download), or utilize one or more aspects of the target entity AI system 102, such as a conversion activity score neural network and/or a persona prediction machine learning model from the server(s) 104. Indeed, in some implementations, as illustrated in FIG. 1, the target entity AI system 102 is located in whole or in part of the recipient device 108 and/or the administrator device 116. For example, the target entity AI system 102 includes a web hosting application that allows the recipient device 108 and/or the administrator device 116 to interact with the server(s) 104. To illustrate, in one or more implementations, the recipient device 108 and/or the administrator device 116 accesses a web page supported and/or hosted by the server(s) 104. For example, the administrator device 116 accesses a web page depicting an entity conversion activity interface that includes a conversion activity probability score and/or a set of key personas.

Although FIG. 1 illustrates a particular arrangement of the environment, in some embodiments, the environment has a different arrangement of components and/or may have a different number or set of components altogether. For instance, as mentioned, the target entity AI system 102 is implemented by (e.g., located entirely or in part on) the recipient device 108 and/or the administrator device 116. In addition, in one or more embodiments, the recipient device 108 and/or the administrator device 116 communicates directly with the target entity AI system 102, bypassing the network 120. Further, in some embodiments, the environment includes a conversion activity score neural network and/or a persona prediction machine learning model maintained by the server(s) 104, the administrator device 116, the recipient device 108, or a third-party device.

Figure 2:
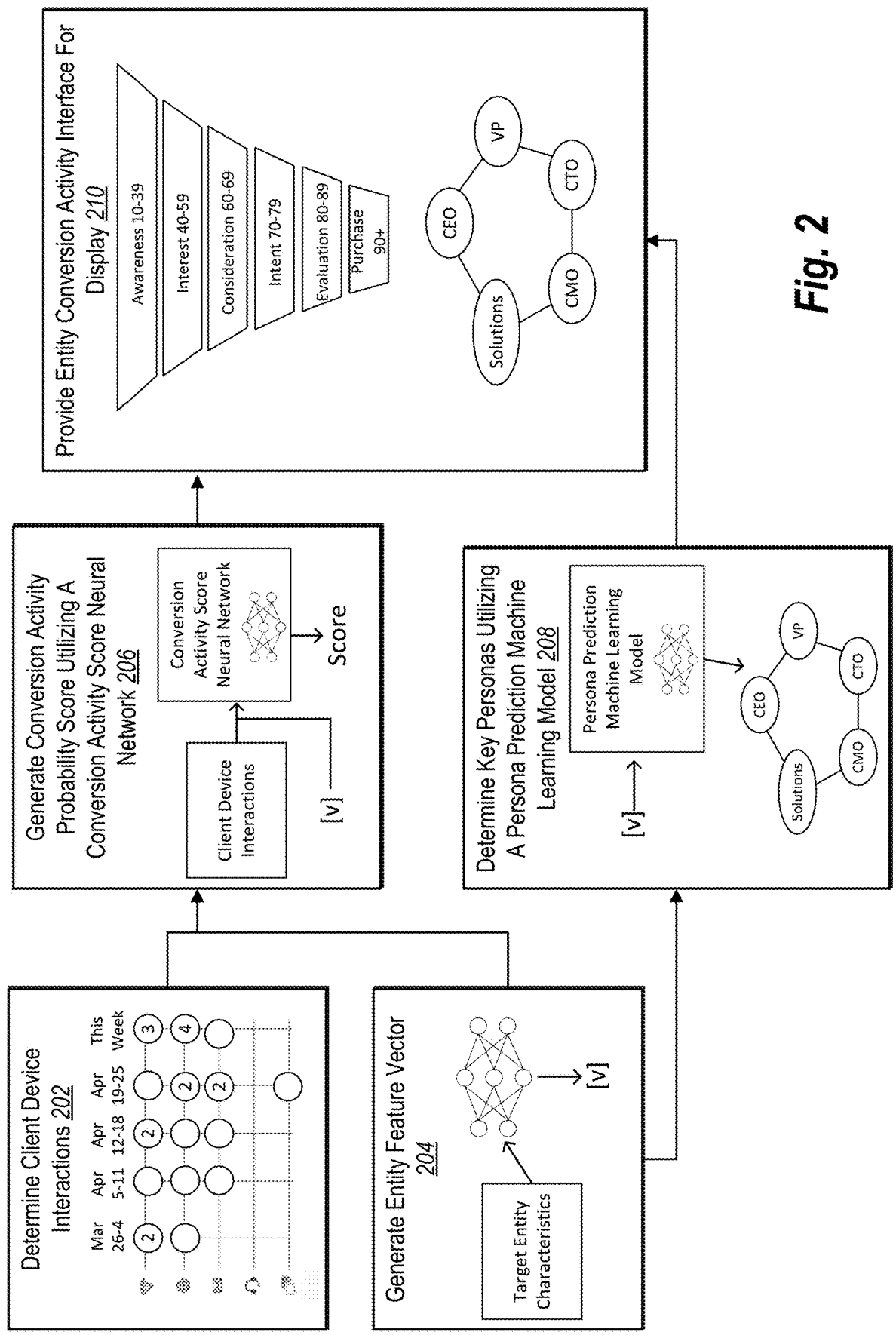
FIG. 2 illustrates an overview of determining a conversion activity probability score and key personas to provide in an entity conversion activity interface in accordance with one or more embodiments.

As mentioned, in one or more embodiments, the target entity AI system 102 generates and provides an entity conversion activity interface for display on an administrator device (e.g., the administrator device 116). In particular, the target entity AI system 102 determines a conversion activity probability score and a set of key personas for including within the entity conversion activity interface. FIG. 2 illustrates an example series of acts for determining a conversion activity probability score, determining key personas, and providing an entity conversion activity interface in accordance with one or more embodiments.

As illustrated in FIG. 2, the target entity AI system 102 performs an act 202 to determine client device interactions. In particular, the target entity AI system 102 determines client device interactions from recipient devices (e.g., the recipient device 108) associated with digital profiles of a target entity. For example, the target entity AI system 102 identifies or detects client device interactions with digital content provided as part of a digital content campaign (e.g., from the digital content provider system 112). Example client device interactions include clicks, views, scrolls, durations of time spent viewing, or other indications of client devices interacting with digital content.

As shown, the target entity AI system 102 determines and tracks different types of client device interactions. For instance, in the week of April 5 to April 11, the target entity AI system 102 identifies a single instance of a first type of client device interaction (e.g., a download or view of digital content), a single instance of a second type of client device interaction (e.g., web-based interaction with digital content), and a single instance of a third type of client device interaction (e.g., email-based interaction with digital content). Looking to the week of April 19 to April 25, the target entity AI system 102 identifies a single instance of a fourth type of client device interaction (e.g., a chat), along with multiple instances of other types of client device interactions.

As also illustrated in FIG. 2, the target entity AI system 102 performs an act 204 to generate an entity feature vector. In particular, the target entity AI system 102 generates an entity feature vector that represents characteristics of a target entity, such as a size of the target entity, a location of the target entity, or other characteristics described herein. For example, the target entity AI system 102 determines target entity characteristics to use as a basis for generating an entity feature vector. In some cases, the target entity AI system 102 monitors or detects internet traffic such as IP addresses of recipient devices associated with a target entity to determine an internet footprint for the target entity (e.g., indicating where and when digital profiles of the target entity frequently visit online).

To generate the entity feature vector, in some cases, the target entity AI system 102 utilizes a machine learning model (e.g., one or more layers of a neural network). More specifically, the target entity AI system 102 utilizes a one or more layers of a neural network (e.g., an encoder neural network) such as a conversion activity score neural network to extract or encode an entity feature vector. For instance, the target entity AI system 102 provides a list (or some other format) of target entity characteristics to the entity vector encoder which then generates the entity feature vector that represents the target entity characteristics mathematically.

As further illustrated in FIG. 2, the target entity AI system 102 performs an act 206 to generate a conversion activity probability score utilizing a conversion activity score neural network. More specifically, the target entity AI system 102 generates a conversion activity probability score that indicates how likely a target entity is to perform a certain conversion activity. In some cases, the target entity AI system 102 generates a conversion activity probability score from client device interactions (e.g., as determined via the act 202) and/or an entity feature vector (e.g., as generated via the act 204).

In certain embodiments, the target entity AI system 102 utilizes a conversion activity score neural network to generate a conversion activity probability score. For instance, the target entity AI system 102 inputs a list (or some other format) of client device interactions and/or the entity feature vector into the conversion activity score neural network, whereupon the conversion activity score neural network generates a conversion activity probability score. Thus, based on the client device interactions performed by digital profiles associated with a target entity, and further based on characteristics of the target entity, the target entity AI system 102 generates a conversion activity probability score that indicates how likely the target entity is to perform a conversion activity. In certain cases, the target entity AI system 102 determines which content to distribute and to which digital profiles based on the conversion activity probability score (or a funnel stage corresponding to the conversion activity probability score). Additional detail regarding generating the conversion activity probability score utilizing the conversion activity score neural network is provided below with reference to FIG. 3.

As further illustrated in FIG. 2, the target entity AI system 102 performs an act 208 to determine key personas utilizing a persona prediction machine learning model. More specifically, the target entity AI system 102 inputs an entity feature vector for a target entity into the persona prediction machine learning model, whereupon the persona prediction machine learning model generates a number of key personas for the target entity. For instance, the target entity AI system 102 determines a number of key personas within the target entity that are relevant to making decisions for the target entity (e.g., to perform conversion activities) and/or that are involved in modifying digital content utilized by the target entity (e.g., upgrading, purchasing, transferring, or distributing digital content within the target entity). As shown, the key personas include a CEO, a VP, a CTO, a CMO, and Solutions position. In some cases, the target entity AI system 102 determines key personas based only on the entity feature vector, while in other cases, the target entity AI system 102 determines key personas based further on client device interactions. Additional detail regarding determining key personas utilizing the persona prediction machine learning model is provided below with reference to FIG. 4.

Additionally, the target entity AI system 102 performs an act 210 to provide an entity conversion activity interface for display. In particular, the target entity AI system 102 generates an entity conversion activity interface that includes an indication of a conversion activity probability score and/or an indication of key personas for the target entity. In some cases, the target entity AI system 102 provides the entity conversion activity interface for display on an administrator device (e.g., the administrator device 116).

In providing the entity conversion activity interface, in some embodiments, the target entity AI system 102 provides a depiction of a conversion activity funnel for display, including a number of conversion activity probability scores corresponding to respective funnel stages. As shown, higher scores correspond to funnel stages with higher likelihoods of performing a conversion activity. In addition, the target entity AI system 102 provides, as part of the entity conversion activity interface, a visual representation of key personas for the target entity. As shown, the target entity AI system 102 provides five key personas with their corresponding titles, roles, or positions within the target entity. By including a conversion activity probability score element (e.g., as part of a conversion activity funnel) together with a key persona element, the target entity AI system 102 provides an entity conversion activity interface that is more efficient than interfaces of conventional systems.

Figure 3:
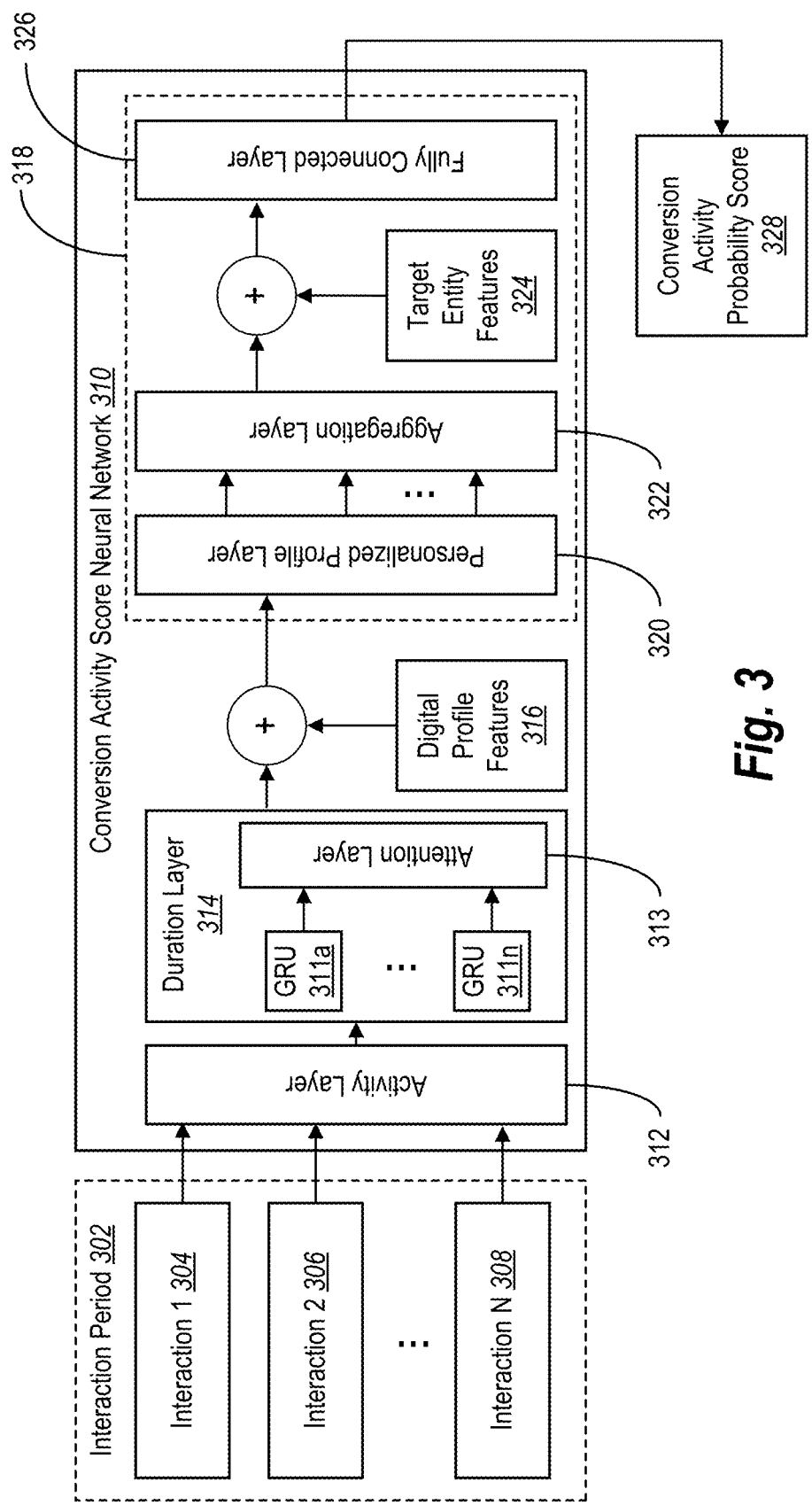
FIG. 3 illustrates an example architecture for a conversion activity score neural network in accordance with one or more embodiments.

As mentioned above, in certain described embodiments, the target entity AI system 102 utilizes a conversion activity score neural network to generate a conversion activity probability score for a target entity. In particular, the target entity AI system 102 utilizes a conversion activity score neural network that includes particular layers for processing data from client device interactions and/or an entity feature vector to generate a conversion activity probability score. FIG. 3 illustrates an example architecture of a conversion activity score neural network 310 for generating a conversion activity probability score 328 in accordance with one or more embodiments. Additional detail regarding the operation and architecture of the conversion activity score neural network 310 is described in U.S. patent application Ser. No. 17/171,365 entitled Machine-Learning Systems for Simulating Collaborative Behavior by Interacting Users within a Group, which is incorporated by reference herein in its entirety.

As illustrated in FIG. 3, the target entity AI system 102 determines a number of client device interactions within an interaction period 302. To elaborate, the target entity AI system 102 determines the interaction period 302 as a period over which to detect and identify client device interactions for a target entity. For instance, the target entity AI system 102 generates a client device interaction log for the interaction period 302 and that includes time-stamped client device interactions such as Interaction 1 304, Interaction 2 306, and so on through Interaction N 308 that occur during the interaction period 302. In some embodiments, the interaction period 302 is one day, while in other embodiments the interaction period is another duration of time such as a week, a month, or a year (e.g., as set by the administrator device 116).

As shown, the target entity AI system 102 inputs the client device interactions (e.g., Interaction 1 304, Interaction 2 306, and so on through Interaction N 308) into the conversion activity score neural network 310. Specifically, the target entity AI system 102 inputs the client device interactions into an activity layer 312 of the conversion activity score neural network 310. In turn, the activity layer 312 generates or extracts a vector representation of the interaction period 302 (or the client device interactions that occurred during the interaction period 302).

Additionally, the target entity AI system 102 passes the vector representation of the interaction period 302 output from the activity layer 312 to the duration layer 314. In some cases, the target entity AI system 102 also feeds client device interactions from a number of other interaction periods (e.g., previous interaction periods of the same periodicity) into the duration layer 314. The duration layer 314 analyzes the interaction period(s) to generate an interaction vector representing the client device interactions. In some cases, the duration layer 314 generates an interaction vector that represents client device interactions over a rolling time window (e.g., a most recent number of interaction periods).

For instance, the duration layer 314 includes an attention layer 313 and one or more gated recurrent units ("GRUs") (or other recurrent neural network architecture, such as an LSTM) to process the client device interactions of the interaction period 302. Indeed, the target entity AI system 102 passes each client device interaction into one or more GRUs, such as the GRU 311a and the GRU 311n. In certain cases, each GRU 311a-311n is pretrained on behavior logs to detect certain patterns. Specifically, the GRUs 311a-311n analyze respective client device interactions to determine patterns and to determine which information (e.g., which features) to pass on as output (e.g., for combining with digital profile features 316). For example, the GRUs 311a-311n each include a plurality of cells, where each cell is associated with (e.g., processes) a respective interaction from the interaction period 302 (e.g., Interaction 1 304 or Interaction 2 306). In some embodiments, instead of the GRUs 311a-311n, the activity layer 312 includes a long-short-term-memory neural network for detecting patterns within client device interactions.

In addition, the target entity AI system 102 passes the output of the GRUs 311a-311n to the attention layer 313 (e.g., a hierarchical attention neural network) which is pretrained on behavior logs to determine which client device interactions (or which features of the client device interactions) to focus on (e.g., to attend to). For example, the attention layer 313 emphasizes or weights the processing or the analysis performed by the activity layer 312 to skew more heavily toward client device interactions that are more impactful or meaningful in leading to target entities performing conversion activities. In some cases, the attention layer 313 analyzes features extracted from the client device interactions relating to indications of types of interactions, when the interactions occur, and where the interactions takes place to determine which features to attend to more than others. Thus, the attention layer 313 (e.g., as part of the activity layer 312) generates one or more interaction vectors corresponding to the client device interactions of the interaction period 302.

As shown, in some embodiments, the target entity AI system 102 combines digital profile features 316 with the interaction vector. For example, the target entity AI system 102 extracts digital profile features 316 from digital profiles associated with (e.g., belonging to) a target entity. In addition, the target entity AI system 102 concatenates the digital profile features with the generated interaction vector from the duration layer 314.

As further illustrated in FIG. 3, the target entity AI system 102 passes the concatenated vector (e.g., the combined vector that includes the digital profile features and the interaction vector) into an entity layer 318 of the conversion activity score neural network 310. In particular, the entity layer 318 includes multiple constituent, internal layers that are involved in generating vectors specific to the target entity. For example, the entity layer 318 includes a personalized profile layer 320, an aggregation layer 322, and a fully connected layer 326.

As shown, the target entity AI system 102 provides the aforementioned concatenated vector to the personalized profile layer 320. In some cases, the personalized profile layer 320 includes a fully connected layer for each digital profile of the target entity. In turn, the personalized profile layer 320 generates a profile vector for each digital profile of the target entity by processing the concatenated vector input from the duration layer 314 (where the profile vector also includes the digital profile features 316). Thus, the profile vectors represent client device interactions and features associated with individual digital profiles of the target entity. Indeed, as shown, the target entity AI system 102 passes the profile vectors from the personalized profile layer 320 to the aggregation layer 322 (as represented by the multiple arrows from the personalized profile layer 320 to the aggregation layer 322).

In addition, the aggregation layer 322 aggregates the multiple profile vectors output from the personalized profile layer 320. For instance, the aggregation layer 322 combines the profile vectors together to create a single, combined profile vector for the digital profiles of the target entity. Further, the target entity AI system 102 combines target entity features 324 with the combined profile vector. For example, the target entity AI system 102 combines target entity features from an entity feature vector that represents characteristics such as size and industry (and others, as mentioned above) of the target entity. In some embodiments, the aggregation layer 322 aggregates the combined profile vector with the target entity features 324 using a feed-forward neural network.

In some cases, the entity layer 318 also includes an attention layer for emphasizing, or attending to, certain features of the target entity features 324 that are more impactful or that correspond more closely to the target entity ultimately performing a conversion activity. For example, the target entity AI system 102 passes the concatenated vector that includes the target entity features 324 and the combined profile vector to an attention layer that is pretrained to identify or detect which target entity features to emphasize or attend to (e.g., those that correspond more closely with performing conversion activities).

As shown, the target entity AI system 102 passes the concatenated vector that includes the target entity features 324 and the combined profile vector to the fully connected layer 326. In certain embodiments, the fully connected layer 326 is a fully connected feed-forward neural network that generates the conversion activity probability score 328. For example, the fully connected layer 326 generates the conversion activity probability score 328 from the concatenated vector that includes target entity features 324 and the combined profile vector from the aggregation layer 322.

Figure 4:
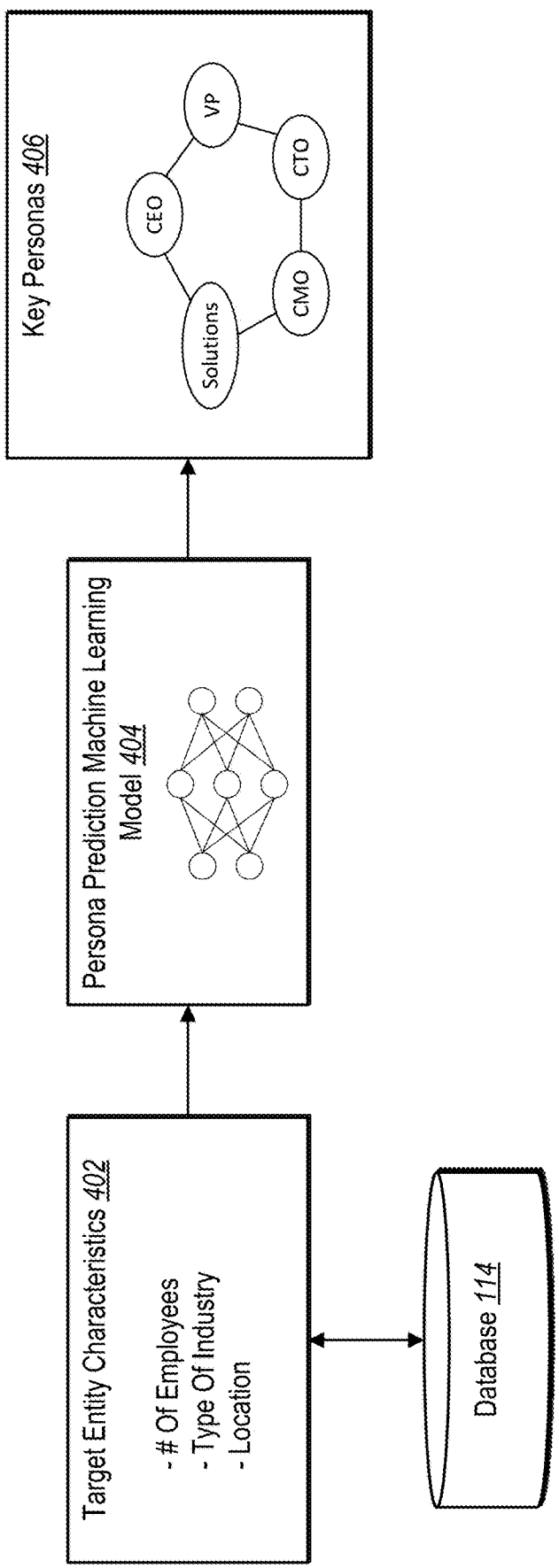
FIG. 4 illustrates an example of utilizing a persona prediction machine learning model to determine key personas in accordance with one or more embodiments.

As mentioned, in certain described embodiments, the target entity AI system 102 determines key personas for the target entity. In particular the target entity AI system 102 utilizes a persona prediction machine learning model to determine one or more key personas involved in decision making for the target entity. FIG. 4 illustrates determining key personas 406 utilizing a persona prediction machine learning model 404 in accordance with one or more embodiments.

As illustrated in FIG. 4, the target entity AI system 102 determines target entity characteristics 402 for a target entity. In some cases, the target entity AI system 102 determines or accesses target entity characteristics from the database 114. For example, similar to the description above, the target entity AI system 102 determines target entity characteristics 402 such as a number of employees, a number of positions, a number of employees in each position, a number of branches or offices, a type of industry, a geographic location, internet traffic information (e.g., IP addresses of devices associated with the target entity, visited websites, previous conversion activities and which digital profiles performed them), identifications of digital profiles joining particular calls or meetings (e.g., online meetings), and other characteristics described above. In certain cases, the target entity characteristics 402 are publicly available information, while in other cases, the target entity characteristics 402 include information that is accessible from data mining systems or other distributors.

In some embodiments, the target entity AI system 102 inputs the target entity characteristics 402 into the persona prediction machine learning model 404. For example, as described above, the target entity AI system 102 generates an entity feature vector that represents the target entity characteristics 402 and inputs the entity feature vector into the persona prediction machine learning model 404. As another example, the persona prediction machine learning model 404 generates the entity feature vector from the target entity characteristics 402 utilizing one or more of its internal layers.

In one or more implementations, the persona prediction machine learning model 404 is a neural network that includes various layers and neurons for extracting and processing features from the target entity characteristics 402. For instance, in some cases, the persona prediction machine learning model 404 is a convolutional neural network and/or a deep neural network that generates an entity feature vector from the entity characteristics and that further processes the entity feature vector to determine key personas 406. In some cases, the persona prediction machine learning model 404 passes extracted features between neurons, from one layer to the next, to identify or isolate features that indicate particular roles or positions within the target entity that make decisions for conversion activities. The persona prediction machine learning model 404 thus outputs the key personas 406.

To elaborate, the target entity AI system 102 determines, selects, or identifies a set or a collection of positions within the target entity that are key personas. To accomplish this, the target entity AI system 102 determines all positions held by digital profiles associated with the target entity and/or accesses a list of positions within the target entity. In addition, the persona prediction machine learning model 404 determines key persona scores for each of the positions within the target entity to indicate whether or not each position is a key persona. For example, the persona prediction machine learning model 404 determines or predicts a key persona score based on the target entity characteristics 402 as well as the internal parameters/weights associated with neurons and layers of the persona prediction machine learning model 404.

Based on determining key persona scores for the various positions within a target entity, the persona prediction machine learning model 404 further identifies or determines which positions correspond to key personas. For example, the persona prediction machine learning model 404 (or the target entity AI system 102) compares the key persona scores with a key persona threshold and selects those positions with key persona scores that satisfy the threshold as key personas. In certain implementations, the target entity AI system 102 sets or determines a key persona threshold based on the target entity characteristics 402 (e.g., based on a number of known target entity characteristics and/or which target entity characteristics are known) to indicate a threshold measure of confidence for determining that a certain position is a key persona. In other implementations, the key persona threshold is set at a default value that represents a threshold measure of confidence for determining that a certain position is a key persona. Thus, the target entity AI system 102 identifies, utilizing the persona prediction machine learning model 404, those positions within the target entity that are most likely to be involved in conversion activities.

In certain cases, the persona prediction machine learning model 404 ranks the positions by key persona score and selects a top (e.g., high-scoring) number of positions as key personas. In these or other cases, the persona prediction machine learning model 404 selects or determines the number of key personas based on the target entity characteristics 402 (such as the size of the target entity).

Indeed, in these or other embodiments, the persona prediction machine learning model 404 determines key personas 406 for the target entity from the target entity characteristics. Specifically, the persona prediction machine learning model 404 determines both a number of key personas 406 as well as positions or roles of the key personas 406 within the target entity. Indeed, the persona prediction machine learning model 404 outputs a set of one or more key personas 406 that indicate positions or roles within the target entity that are associated with (e.g., involved in, required for, or essential to) performing conversion activities for the target entity and/or that are involved in modifying digital content of the target entity. As shown, the key personas 406 include five different positions within the target entity that are involved in deciding whether to perform a conversion activity: chief executive officer ("CEO"), vice president ("VP"), chief technical officer ("CTO"), chief marketing officer ("CMO"), and a Solutions manager.

While FIG. 4 illustrates five key personas, in some embodiments, the target entity AI system 102 determines a set of key personas that includes more or fewer than five positions. For example, the target entity AI system 102 determines more key personas for larger target entities that have larger teams making decisions for conversion activities. For a small target entity, in some cases, the target entity AI system 102 determines fewer key personas because fewer target entity positions are involved in performing conversion activities.

In some cases, the target entity AI system 102 further ranks the key personas 406. For example, the target entity AI system 102 determines or identifies which key personas are more important or more relevant for performing conversion activities than others. In some cases, the persona prediction machine learning model 404 not only outputs the key personas 406 but further outputs a ranking of the key personas 406, indicating which key personas are more relevant than others (e.g., based on target entity characteristics indicating numbers of communications between personas, authorization records for conversion activities, and payment information for conversion activities). For example, the target entity AI system 102 ranks the key personas 406 based on key persona scores, as described above.

Figure 5:
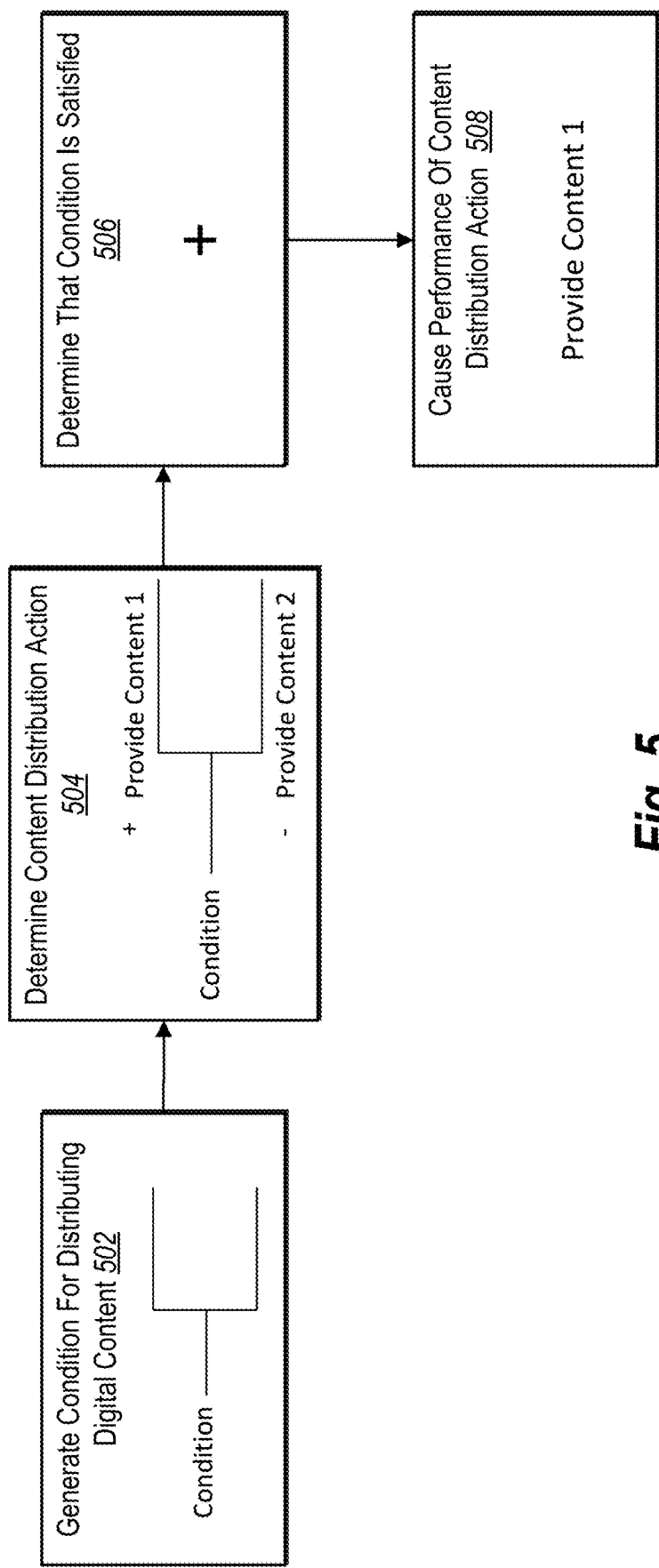
FIG. 5 illustrates an example process orchestrating a target entity journey in accordance with one or more embodiments.

As mentioned above, in certain described embodiments, the target entity AI system 102 orchestrates distribution of digital content to a target entity. In particular, the target entity AI system 102 generates and provides an entity journey interface whereby the administrator device 116 manages or orchestrates distribution of digital content to the target entity. FIG. 5 illustrates an example sequence of acts for orchestrating distribution of digital content for a target entity in accordance with one or more embodiments.

As illustrated in FIG. 5, the target entity AI system 102 performs an act 502 to generate a condition for distributing digital content. To elaborate, the target entity AI system 102 generates a condition that, upon satisfaction, triggers or causes distribution of digital content to one or more digital profiles of a target entity. For example, the target entity AI system 102 provides an entity journey interface for display on the administrator device, whereby an administrator provides input for orchestrating distribution of digital content to the target entity. In some cases, the target entity AI system 102 receives an indication of a selection of a condition element from the administrator device 116. The condition element indicates a particular condition such as: i) an empty key persona within one or more key personas (e.g., the key personas 406) identified for a target entity, ii) a conversion activity probability score satisfying a conversion activity probability threshold, iii) the target entity utilizing a competitor content provider system, iv) a previous conversion activity, or v) adoption scores associated with previous conversion activities (e.g., scores indicating how many digital profiles of the target entity utilize digital content from a recent purchase). Other possible conditions include a threshold number of identified or filled key personas, a complete set of key personas (e.g., where all key personas are associated with a specific digital profile), a threshold number of client device interactions (e.g., of all types or a particular type) with distributed digital content, or a threshold number of distributed digital content items.

As shown, the target entity AI system 102 also performs an act 504 to determine a content distribution action. In particular, the target entity AI system 102 determines an action for distributing digital content to one or more digital profiles of a target entity, predicated on the condition (e.g., from the act 502) being satisfied. In some cases, the target entity AI system 102 receives an indication of a selection of a content distribution element from the administrator device 116. For instance, in some cases, the target entity AI system 102 determines a content distribution action to perform (or to cause to be performed) upon satisfaction of the condition (e.g., Provide Content 1), and further determines another content distribution action to perform (or to cause to be performed) upon dissatisfaction of the condition (e.g., Provide Content 2). In some cases, the content distribution action indicates a particular digital content item to provide and further indicates particular digital profiles (e.g., one or more digital profiles corresponding to key personas) of the target entity as recipients for the digital content.

As further illustrated in FIG. 5, the target entity AI system 102 performs an act 506 to determine that the condition is satisfied (or dissatisfied). For example, the target entity AI system 102 determines that a set of key personas for a target entity is incomplete (e.g., includes at least one empty key persona). To identify or determine digital profiles corresponding to key personas, the target entity AI system 102 analyzes client device interactions, digital profile characteristics (e.g., name, assigned position in the target entity, job description, or others mentioned above), and target entity characteristics.

For example, the target entity AI system 102 inputs this information into a key persona identification model to determine digital profiles that correspond to particular key personas. In some cases, the target entity AI system 102 generates predictions of confidence scores for digital profiles. In some embodiments, the target entity AI system 102 utilizes a digital profile prediction model (e.g., a neural network) to determine or predict digital profiles corresponding to particular key personas. For instance, the target entity AI system 102 determines confidence scores for digital profiles based on available digital profile characteristics and/or client device interactions of the digital profiles (e.g., by inputting digital profile characteristics and/or client device interactions into a digital profile prediction model). In some embodiments, for each of the key personas, the target entity AI system 102 determines confidence scores for every digital profile (in relation to each key persona) of a target entity to identify or select a digital profile (e.g., a highest-scored digital profile) as corresponding to a given key persona.

In these or other cases, the target entity AI system 102 compares the confidence scores to a key persona confidence threshold that indicates a minimum score required to assign or match a digital profile to a given key persona. In some cases, the target entity AI system 102 utilizes different key persona confidence thresholds for different key personas (e.g., depending on key persona rankings, where higher-ranked key personas are more important for performing conversion activities and therefore require higher confidence thresholds).

In one or more embodiments, to determine that the set of key personas is incomplete, the target entity AI system 102 determines that no digital profile has a key persona confidence score that satisfies the key persona confidence threshold. For instance, the target entity AI system 102 determines that no digital profile satisfies the key persona confidence threshold for a VP key persona. Thus, while the target entity AI system 102 identifies a digital profile for a CEO key persona, another digital profile for a CMO key persona, and so on (e.g., based on target entity characteristics and client device interactions), the target entity AI system 102 determines no digital profile for the VP key persona. As illustrated in FIG. 5, upon determining that one or more of the key personas are unaffiliated with a corresponding digital profile, the target entity AI system 102 determines that the condition is satisfied.

As another example, the target entity AI system 102 determines that a conversion activity probability score for the target entity satisfies a conversion activity probability threshold. To determine that the conversion activity probability score satisfies a conversion activity probability threshold, in some cases, the target entity AI system 102 compares the conversion activity probability score against a conversion activity threshold set by the administrator device 116 (or a default threshold). Based on detecting new client device interactions and/or updated target entity characteristics, the target entity AI system 102 updates or modifies a conversion activity probability score for the target entity (e.g., by re-applying the conversion activity score neural network 310 and/or the persona prediction machine learning model 404). Thus, based on new client device interactions, the target entity AI system 102 modifies the conversion activity probability score and compares the modified score with the threshold.

Upon determining that the condition is satisfied (or dissatisfied), the target entity AI system 102 performs an act 508 to cause performance of a content distribution action. More specifically, the target entity AI system 102 causes performance of the content distribution action determined via the act 504. For example, upon determining that a set of key personas is incomplete, the target entity AI system 102 causes a digital content provider to perform a content distribution action to Provide Content 1 (e.g., with the aim of identifying digital profiles for empty key personas). In some cases, the target entity AI system 102 provides an indicator to the digital content provider to automatically (e.g., without user input) trigger providing the digital content. For instance, the target entity AI system 102 causes the digital content provider to provide an email or a digital video to one or more digital profiles of the target entity based on determining that the condition is satisfied.

In performing the act 508, various other content distribution actions are possible. For example, in some cases, the target entity AI system 102 determines (as part of the act 506) that the target entity is utilizing a competitor content provider system and therefore launches a digital content campaign for distributing digital content relevant to the competitor content provider system. As another example, the target entity AI system 102 determines (as part of the act 506) that a digital profile (e.g., a digital profile associated with a key persona) has viewed a particular webpage (e.g., a pricing page) and therefore launches a digital content campaign to provide emails and/or web personalization to various digital profiles. As yet another example, the target entity AI system 102 determines (as part of the act 506) that the target entity has performed a previous conversion activity and therefore launches a digital content campaign to provide particular digital content to motivate an additional or upgraded conversion activity.

Figure 6:
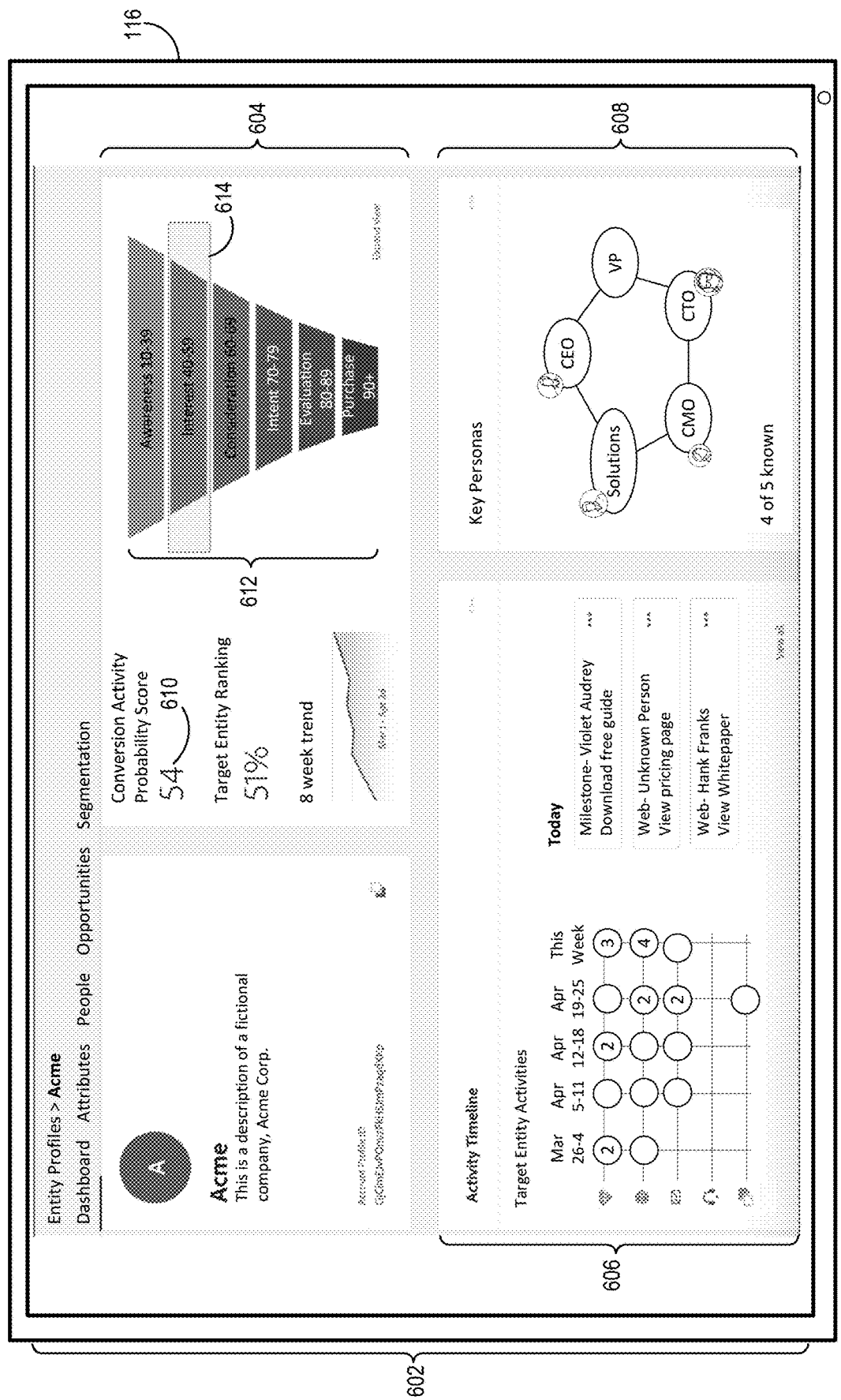
FIG. 6 illustrates an example process entity conversion activity interface in accordance with one or more embodiments.

As mentioned above, in certain described embodiments, the target entity AI system 102 generates and provides various user interfaces for display on the administrator device 116. In particular, the target entity AI system 102 provides an entity conversion interface for display that includes various visual elements relating to conversion activity probability scores and key personas. FIG. 6 illustrates an example entity conversion activity interface 602 displayed by the administrator device 116 in accordance with one or more embodiments.

As illustrated in FIG. 6, the entity conversion activity interface 602 depicts different information determined (as described above) for a target entity ("Acme") to an administrator operating the administrator device 116. For example, the entity conversion activity interface 602 includes various portions or elements, such as a conversion activity score element 604, a key persona element 608, and a client device interaction element 606. Within the conversion activity score element 604, the entity conversion activity interface 602 includes a conversion activity probability score 610, a conversion activity funnel 612, and an indicated funnel stage 614.

As shown, the entity conversion activity interface 602 includes a conversion activity score element 604. Indeed, the target entity AI system 102 generates and provides the conversion activity score element 604 to indicate the conversion activity probability score 610 associated with the target entity. The conversion activity score element 604 also indicates information such as a target entity ranking (e.g., a percentile among a group of target entities), a historical conversion activity score trend, and a conversion activity funnel 612. Within the conversion activity funnel 612, the conversion activity score element 604 also indicates a funnel stage 614 associated with the target entity and that corresponds to the conversion activity probability score 610.

As also shown, the entity conversion activity interface 602 includes a key persona element 608 that indicates a number of key personas for the target entity. In particular, the key persona element 608 portrays five key personas, four of which are filled by or associated with a corresponding digital profile. As shown, the VP key persona is unaffiliated with a corresponding digital profile and is therefore an empty key persona. The key persona element 608 includes an indication that the key personas are incomplete (e.g., "4 of 5 known").

As further shown, the entity conversion activity interface 602 includes a client device interaction element 606. Within the client device interaction element 606, the administrator device 116 displays a timeline of client device interactions corresponding to the target entity, including numerical counters for specific client device interactions and when they took place. In addition, the client device interaction element 606 indicates client device interactions that occurred on the same day ("Today"), including indications of the type of the interaction (e.g., web, email, etc.), the digital profile that performed the client device interaction, and the type of client device interaction (e.g., "Download free guide" or "View pricing page"). In some cases, the entity conversion activity interface 602 includes a banner of interaction details for any of the circles or bubbles selected or hovered over within the timeline.

Figure 7:
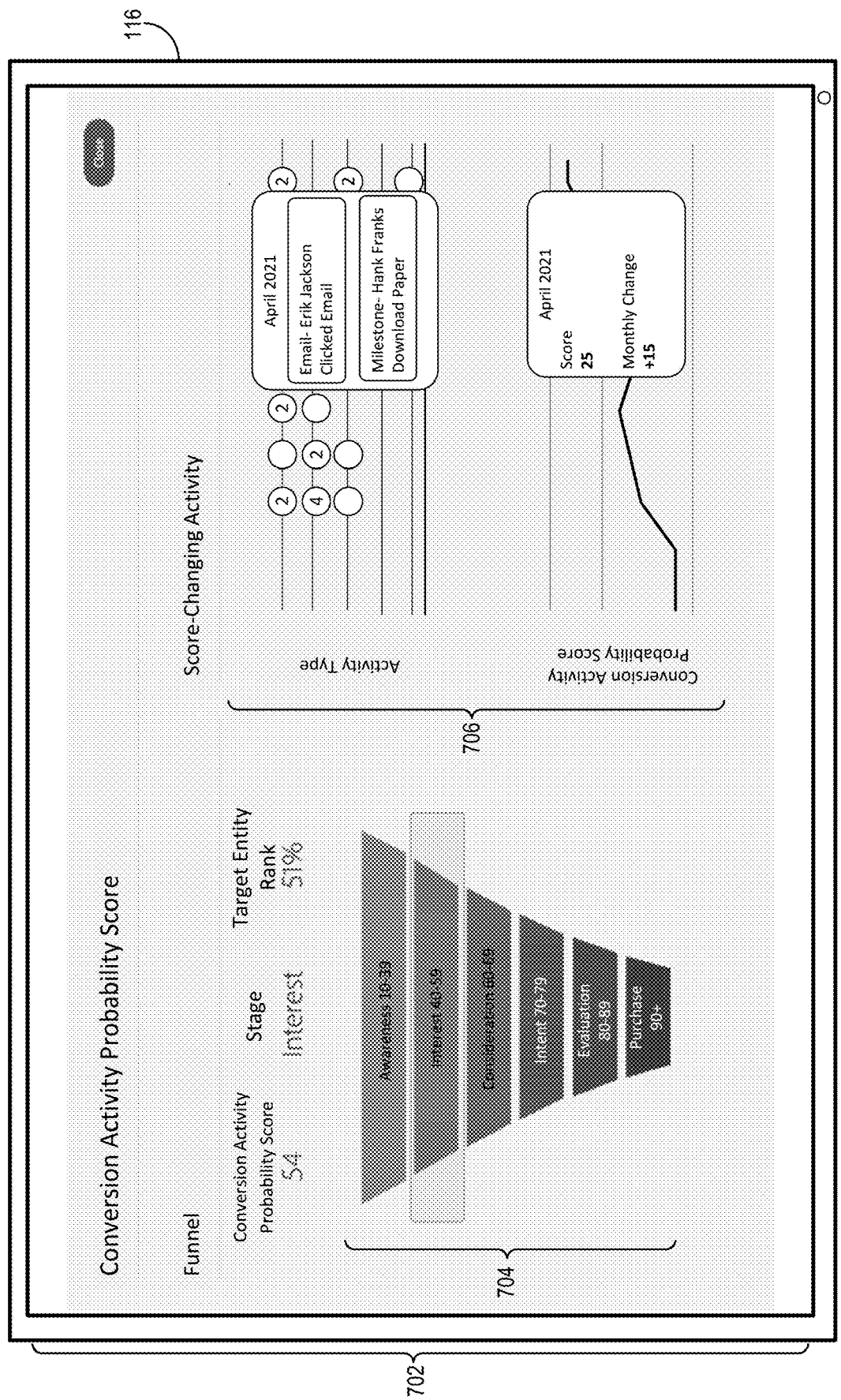
FIG. 7 illustrates an example conversion activity score interface in accordance with one or more embodiments.

Based on user interaction selecting a conversion activity score expansion element (e.g., an "Expand View" button), the target entity AI system 102 provides a conversion activity score interface for display. In particular, the target entity AI system 102 generates and provides a conversion activity score interface that provides additional details and breakdown for the conversion activity score element 604. FIG. 7 illustrates an example conversion activity score interface 702 displayed on the administrator device 116 in accordance with one or more embodiments.

As illustrated in FIG. 7, the conversion activity score interface 702 includes a conversion activity funnel 704 and a score-changing activity portion 706. As shown, the conversion activity funnel 704 indicates various funnel stages leading toward a conversion activity (e.g., "Purchase"), where each funnel stage corresponds to a particular range of conversion activity probability scores. For a different conversion activity, the conversion activity funnel 704 can indicate different funnel stages with a different conversion activity at the end (e.g., "Additional purchase" or "Upgraded purchase").

In some cases, the conversion activity funnel 704 includes funnel stages for churn or offboarding. For example, the target entity AI system 102 determines a churn score that indicates a likelihood of a target entity canceling or otherwise discontinuing use of a particular product or service (e.g., based on how often a target entity interacts with digital content associated with a particular product or service). Thus, the conversion activity funnel 704 can indicate one or more funnel stages corresponding to churn prediction and/or retention prediction.

Within the score-changing activity portion 706, the administrator device 116 displays numbers and types of client device interactions (e.g., "Activity Type") along with a representation of changes in conversion activity probability score over time. For example, the illustrated graph indicates how particular client device interactions affect or change the conversion activity probability score. As shown, the conversion activity probability score graph indicates an increase of 15 in the conversion activity probability score for the month of April 2021.

Figure 8:
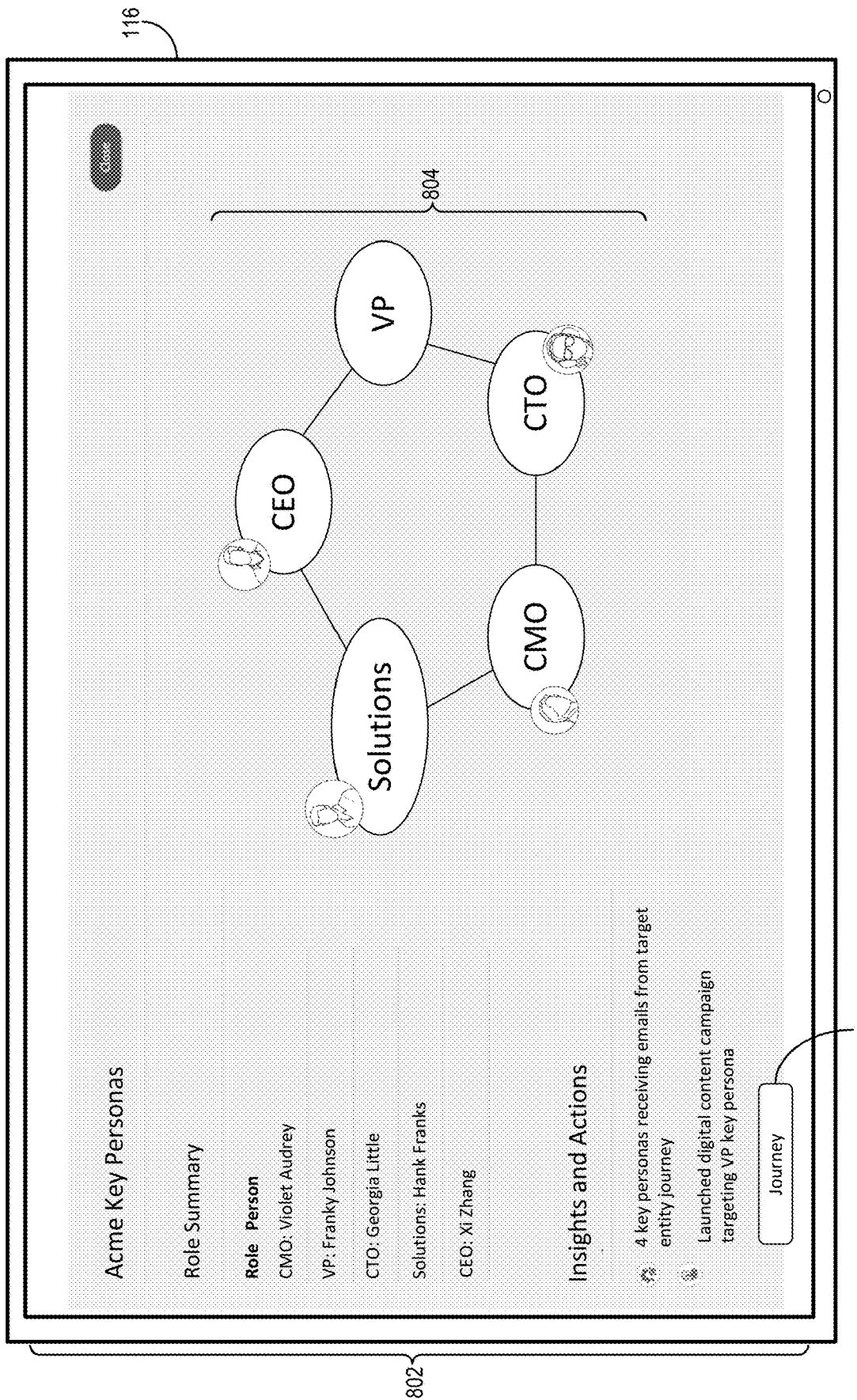
FIG. 8 illustrates an example key persona interface in accordance with one or more embodiments.

Similar to providing the conversion activity score interface 702 that provides additional detail for the conversion activity score element 604, in certain embodiments, the target entity AI system 102 also provides a key persona interface that provides additional detail for the key persona element 608. In particular, the target entity AI system 102 provides a key persona interface that includes details for digital profiles associated with key personas, along with profile images for the digital profiles. FIG. 8 illustrates an example key persona interface 802 displayed on the administrator device 116 in accordance with one or more embodiments.

As illustrated in FIG. 8, the key persona interface 802 includes a key persona element 804. The key persona element 804 indicates a number of key personas for the target entity "Acme" that are involved in performing conversion activities. For example, the key persona element 804 includes five key personas: a CEO, a VP, a CTO, a CMO, and a Solutions position. While the key persona element 804 indicates five key personas for Acme, the key persona element 804 can depict any number of key personas, depending on a number determined for a target entity. Additionally, while the key persona element 804 depicts the key personas in a pentagon shape, alternative representations are also possible, including a listing of key personas (e.g., in ranked order of significance for performing conversion activities), a circle shape, or some other polygon with a number of sides equal to the number of key personas.

In addition, the key persona element 804 includes profile pictures for digital profiles associated with respective key personas. As shown, the profile pictures overlap the key persona bubbles to indicate the digital profiles that are associated with each key persona. Further, the key persona element 804 indicates an empty key persona that does not have a corresponding profile picture (e.g., the VP key persona). Indeed, the target entity AI system 102 generates the key persona element 804 to indicate empty key personas in cases where no digital profile is determined for a given key persona. In some cases, the target entity AI system 102 generates a visual indicator to represent empty key personas, such as a question mark within (or next to) the key persona bubble and/or a different color for the key persona bubble (e.g., different from key persona bubbles with associated digital profiles).

As also illustrated in FIG. 8, the key persona interface 802 includes indications of digital profiles associated with the key personas. Indeed, in addition to the profile pictures, the key persona interface 802 includes a "Role" column indicating the key personas of the target entity and a "Person" column indicating digital profiles associated with the respective key personas. For example, the target entity AI system 102 identifies Violet Audrey as the CMO, Franky Johnson as the VP, and Georgia Little as the CTO.

Additionally, the key persona interface 802 includes an "Insights and Actions" portion that indicates additional details regarding the key personas in the key persona element 804. For example, the key persona interface 802 includes specific indications of digital content distributed to key personas. In some cases, the indication of distributed digital content further indicates whether the key personas are receiving, viewing, or otherwise interacting with digital content distributed based on conditions of a target entity journey (e.g., "4 key personas receiving remails from target entity journey"). As also shown, the "Insights and Actions" portion provides indications for specific key personas (e.g., empty key personas) such as "Launched digital content campaign targeting VP key persona." Indeed, the target entity AI system 102 launches a digital content campaign to ascertain or determine the digital profile associated with the VP key persona.

Figure 9:
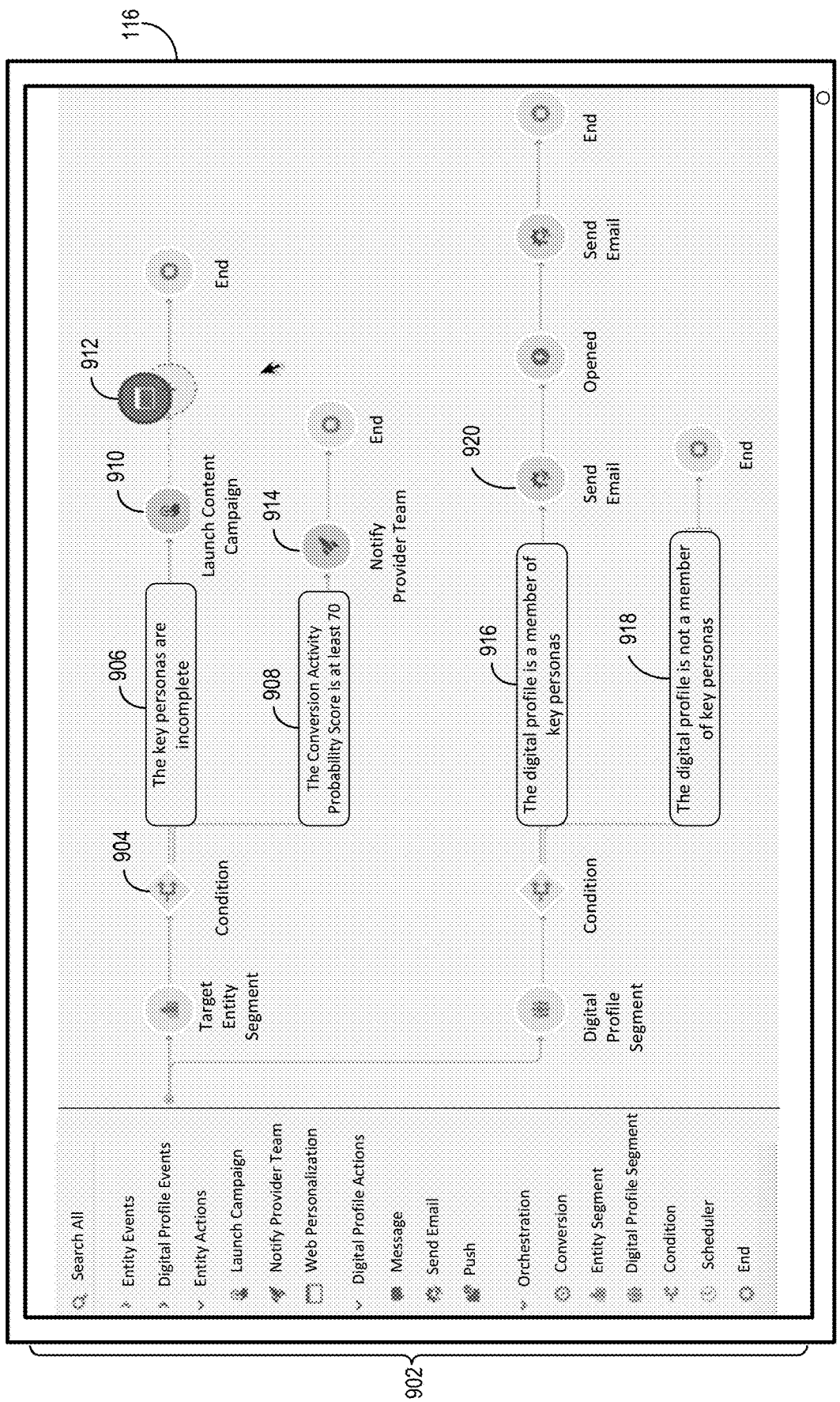
FIG. 9 illustrates an example entity journey interface in accordance with one or more embodiments.

As further illustrated in FIG. 8, the key persona interface 802 includes a journey element 806 selectable to access an entity journey interface. Indeed, based on user selection of the journey element 806, the target entity AI system 102 generates and provides an entity journey interface for display on the administrator device 116. FIG. 9 illustrates an example entity journey interface 902 displayed on the administrator device 116 in accordance with one or more embodiments.

As illustrated in FIG. 9, the example entity journey interface 902 includes branches for multiple segments associated with a target entity, including a Target Entity Segment and a Digital Profile Segment. In some cases, the Target Entity Segment includes conditions and content distribution actions for a target entity as a whole, while the Digital Profile Segment includes conditions and content distribution actions for individual digital profiles within a target entity. For example, the example entity journey interface 902 includes a condition branch element 904 that branches to two different condition elements 906 and 908. In some embodiments, the target entity AI system 102 receives user input from the administrator device 116 to select and add the condition branch element 904, to select and add the condition elements 906 and 908, and to edit or the condition elements 906 and 908 to indicate the specific conditions for each.

As shown, the condition element 906 indicates a condition that "The key personas are incomplete." Thus, the target entity AI system 102 performs any actions corresponding to elements appearing after the condition element 906 only in response to determining that the condition is satisfied (e.g., the key personas for the target entity are incomplete). In addition, the condition element 906 leads to additional elements such as the content distribution elements 910 and 912. As shown, the content distribution element 910 corresponds to a content distribution action to distribute digital content to the target entity via social media (e.g., "Launch Content Campaign").

As further shown, the administrator device 116 is currently receiving user input selecting and dragging the content distribution element 912 to add the content distribution element 912 to the branch of the condition element 906. Indeed, the user input is dragging a "Web Personalization" icon from the menu on the left (under "Entity Actions") to the indicated location. The target entity AI system 102 further facilitates removal of elements such as the content distribution element 912 as well. In some embodiments, the content distribution element 912 corresponds to a content distribution action to provide digital content within a particular website or to send an email. Thus, the target entity AI system 102 performs the content distribution actions corresponding to both the content distribution element 910 and the content distribution element 912 in response to determining that the condition of the condition element 906 is satisfied.

As further illustrated in FIG. 9, the condition element 908 indicates a condition that "The Conversion Activity Probability Score is at least 70." Thus, the target entity AI system 102 performs content distribution actions within the respective branch only upon determining that the condition is satisfied (e.g., that the conversion activity probability score meets or satisfies a conversion activity threshold of 70). As shown, the example entity journey interface 902 includes a content distribution element 914 stemming from the condition element 908. Indeed, the target entity AI system 102 performs the content distribution action to "Notify Provider Team" in response to determining that the conversion activity probability score is at least 70. For instance, the target entity AI system 102 provides emails or other notifications to members of a particular team of profiles or providers associated with the digital content provider system 112.

In addition to depicting conditions and content distribution actions for the target entity as a whole, the example entity journey interface 902 further depicts conditions and content distribution actions for individual digital profiles associated with the target entity. For example, the example entity journey interface 902 includes a condition element 916, a condition element 918, and a content distribution element 920. Similar to the discussion above regarding the Target Entity Segment, the target entity AI system 102 receives user input via the administrator device 116 to select and/or edit the condition element 916, the condition element 918, and/or the content distribution element 920. As shown, the target entity AI system 102 performs (or causes to be performed) a content distribution action to "Send Email" in response to determining that the condition is met that the digital profile is a member of the key personas for the target entity. Additionally, according to the flow of the example entity journey interface 902, the target entity AI system 102 takes no action in response to determining that the digital profile is not a member of the key personas.

Figure 10:
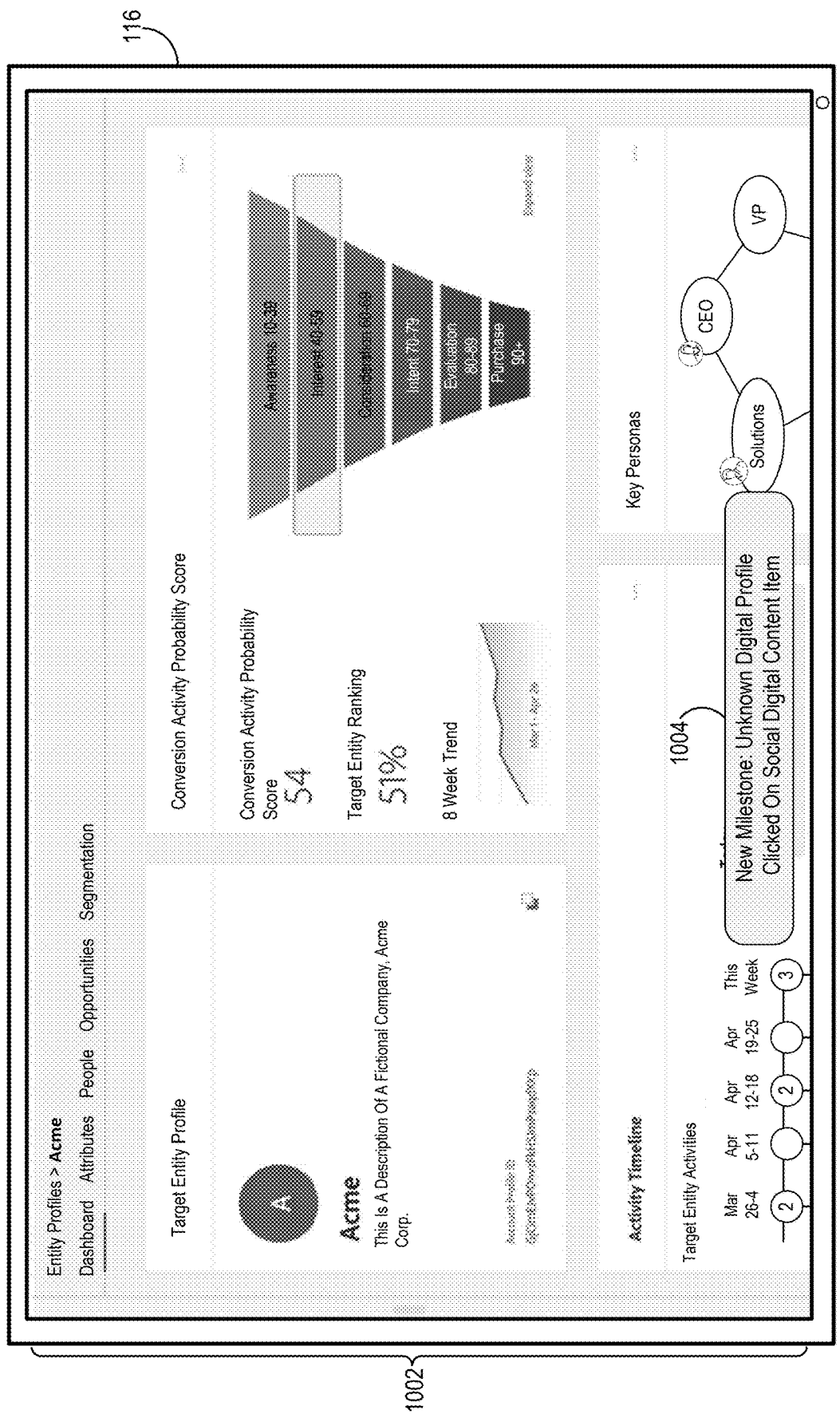
FIG. 10 illustrates an example updated entity conversion activity interface in accordance with one or more embodiments.

As mentioned above, in certain embodiments, the target entity AI system 102 provides notifications of client device interactions. In particular, the target entity AI system 102 provides visual notifications for display via the administrator device 116. FIG. 10 illustrates an entity conversion activity interface 1002 displayed via the administrator device 116 and including an interaction notification 1004 in accordance with one or more embodiments.

As illustrated in FIG. 10, the entity conversion activity interface 1002 includes various elements described above in relation to FIG. 6, such as a conversion activity score element and a key persona element. In addition, the entity conversion activity interface 1002 includes an interaction notification 1004 that notifies the administrator that an unknown digital profile clicked on a social digital content item (e.g., a digital content item distributed via social media). Indeed, the target entity AI system 102 monitors and detects client device interactions from digital profiles of the target entity with digital content provided as part of a digital content campaign. In response to detecting a client device interaction (or a particular client device interaction that causes at least a threshold change in conversion activity probability score or that changes the key personas), the target entity AI system 102 provides an interaction notification such as the interaction notification 1004.

Figure 11:
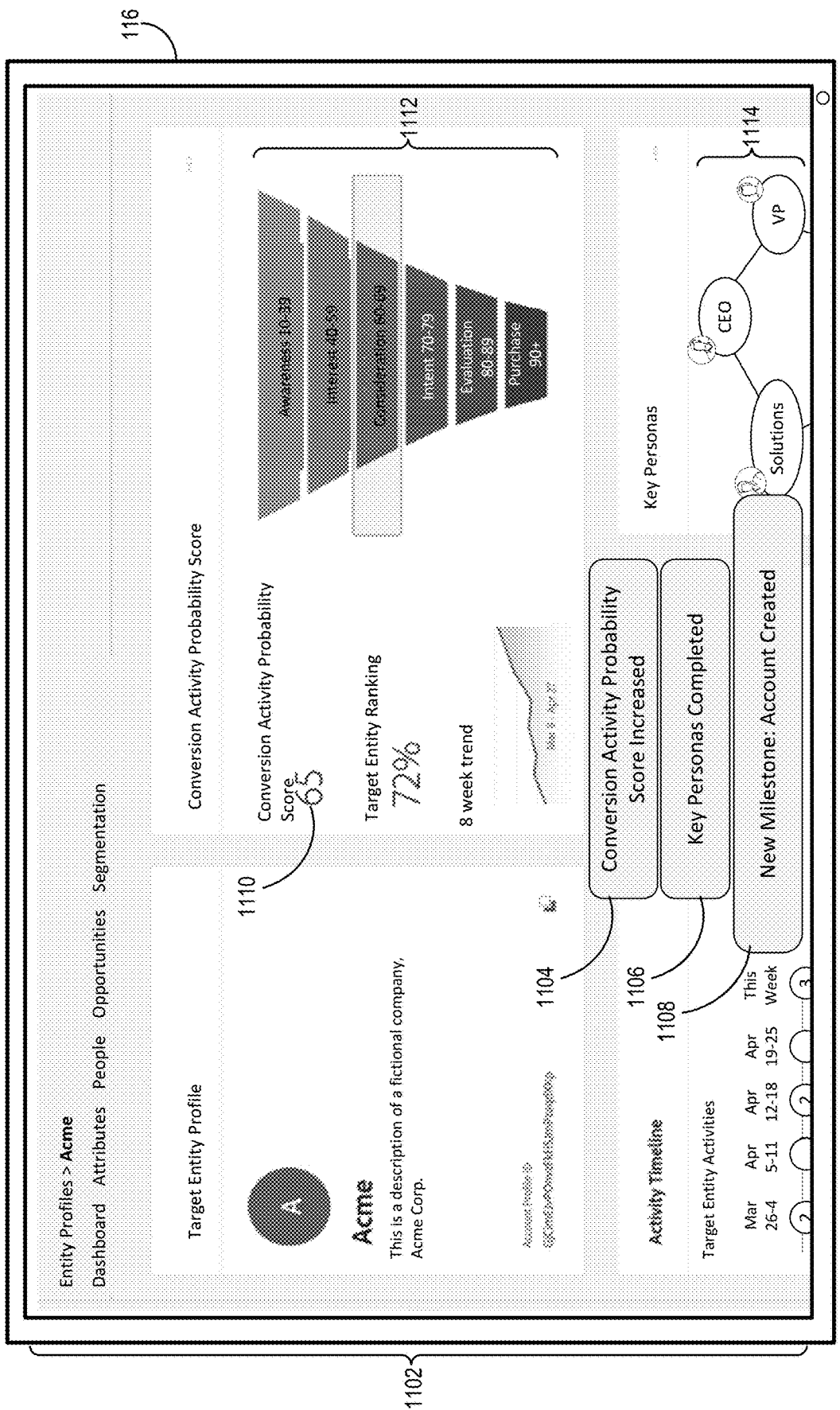
FIG. 11 illustrates an example updated entity conversion activity interface in accordance with one or more embodiments.

In addition to providing notifications of client device interactions, the target entity AI system 102 further provides notifications of changes in the conversion activity probability score, changes in the key personas, and other changes within a target entity. For example, the target entity AI system 102 provides visual notifications for display on the administrator device 116. FIG. 11 illustrates an entity conversion activity interface 1102 displayed via the administrator device 116 and including various notifications in accordance with one or more embodiments.

As illustrated in FIG. 11, the entity conversion activity interface 1102 includes a notification 1104 indicating an increase in conversion activity probability score. For example, the target entity AI system 102 detects a new client device interaction which results in an increase in the conversion activity probability score. As another example, the target entity AI system 102 detects a new account created within the digital content distribution system by a digital profile of the target entity that also results in an increase in the conversion activity probability score. In response, the target entity AI system 102 provides the notification 1104 that the conversion activity probability score has increased. As shown, the entity conversion activity interface 1102 includes a conversion activity probability score 1110 that is increased from that in FIG. 6 (e.g., from 54 to 65). In response, the target entity AI system also modifies the conversion activity funnel 1112 to indicate a new funnel stage ("Consideration") corresponding to the updated conversion activity probability score.

As illustrated in FIG. 11, the entity conversion activity interface 1102 includes a notification 1106. In particular, the notification 1106 indicates that the key personas have been completed. For example, the target entity AI system 102 detects new client device interactions and/or determines new target entity characteristics for a target entity that result in determining a new digital profile corresponding to a previously empty key persona. In some cases, the target entity AI system 102 determines that a new account has been created within the digital content provider system 112 that is associated with, or fills, the empty key persona. As shown in FIG. 11, the target entity AI system 102 fills or completes the key personas by identifying a digital profile corresponding to the VP key persona which was previously unaffiliated with a digital profile. In one or more embodiments, the target entity AI system 102 also provides the notification 1108 to indicate that the new account was created within the digital content provider system 112. As further shown, the entity conversion activity interface 1102 includes the key persona element 1114 that shows a profile picture adjacent to the VP key persona, further indicating that the digital profile has been selected as corresponding to the VP key persona.

Figure 12:
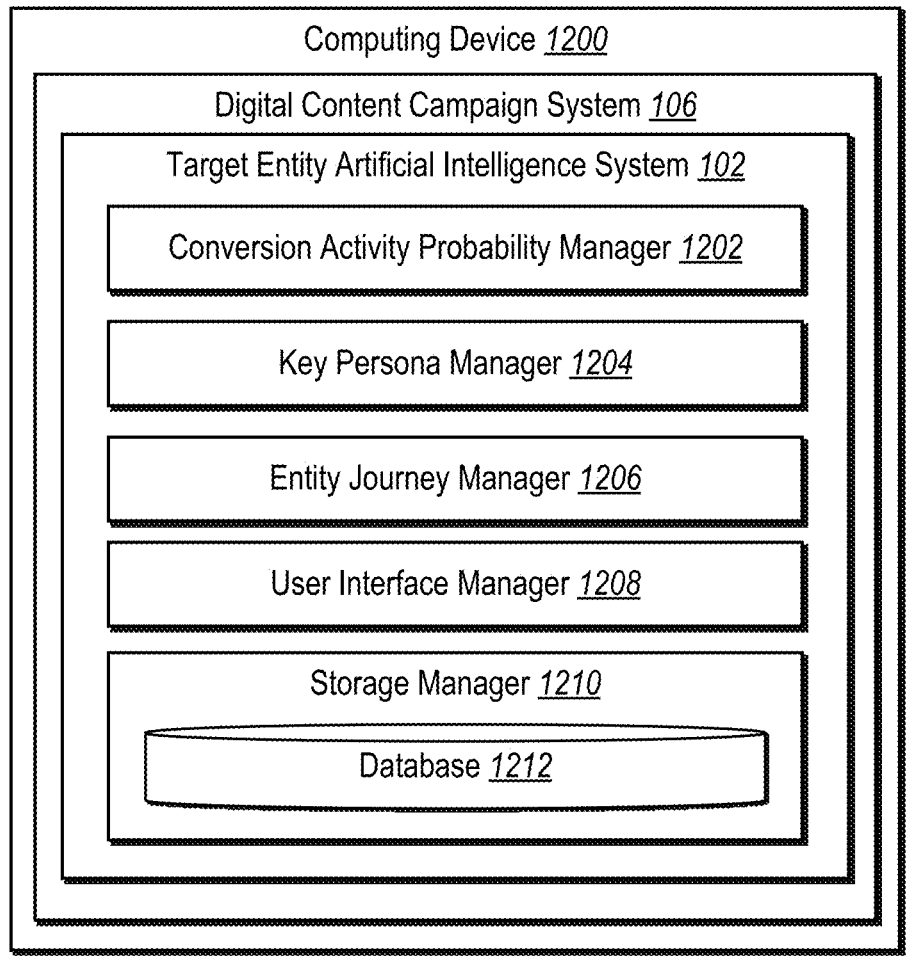
FIG. 12 illustrates a schematic diagram of a target entity AI system in accordance with one or more embodiments.

Looking now to FIG. 12, additional detail will be provided regarding components and capabilities of the target entity AI system 102. Specifically, FIG. 12 illustrates an example schematic diagram of the target entity AI system 102 on an example computing device 1200 (e.g., one or more of the recipient device 108, the administrator device 116, the digital content provider system 112, and/or the server(s) 104). In some embodiments, the computing device 1200 refers to a distributed computing system where different managers are located on different devices, as described above. As shown in FIG. 12, the target entity AI system 102 includes a conversion activity probability manager 1202, a key persona manager 1204, an entity journey manager 1206, a user interface manager 1208, and a stored manager 1210.

As just mentioned, the target entity AI system 102 includes a conversion activity probability manager 1202. In particular, the conversion activity probability manager 1202 manages, maintains, determines, generates, or predicts a conversion activity probability score for a target entity. For example, as described above, the conversion activity probability manager 1202 utilizes a conversion activity score neural network to predict a conversion activity probability score from input data including client device interactions and/or an entity feature vector representing target entity characteristics.

As illustrated in FIG. 12, the target entity AI system 102 also includes a key persona manager 1204. In particular, the key persona manager 1204 manages, maintains, determines, generates, identifies, selects, or predicts key personas for a target entity. For example, the key persona manager 1204 utilizes a persona prediction machine learning model to predict key personas that are involved in performing conversion activities for a target entity. In some cases, the key persona manager 1204 determines a number of key personas as well as positions of the key personas within the target entity. In certain embodiments, as described, the key persona manager 1204 further determines digital profiles within the target entity that correspond to respective key personas and further determines whether any key personas are empty (e.g., not yet associated with a digital profile).

In addition, the target entity AI system 102 includes an entity journey manager 1206. In particular, the entity journey manager 1206 manages, maintains, generates, provides, or orchestrates a target entity journey. For example, the entity journey manager 1206 determines conditions for providing digital content to a target entity and further determines whether or not the conditions are satisfied. In some embodiments, the entity journey manager 1206 also determines and performs (or causes a digital content provider system to perform) digital content distribution actions based on the conditions, as described herein.

As further illustrated in FIG. 12, the target entity AI system 102 includes a user interface manager 1208. In particular, the user interface manager 1208 manages, maintains, generates, provides, displays, or presents various user interfaces via administrator devices and/or recipient devices. For example, as described above, the user interface manager 1208 provides an entity conversion activity interface, an entity journey interface, a conversion activity score interface, and/or a key persona interface for display via an administrator device. In addition, the user interface manager 1208 provides digital content such as digital videos, digital images, emails, or other digital content for display via a recipient device.

The target entity AI system 102 further includes a storage manager 1210. The storage manager 1210 operates in conjunction with, or includes, one or more memory devices such as the database 1212 (e.g., the database 114) that store various data such as a conversion activity score neural network, a persona prediction machine learning model, digital content, digital profiles, target entity characteristics, and/or key personas.

In one or more embodiments, each of the components of the target entity AI system 102 are in communication with one another using any suitable communication technologies. Additionally, the components of the target entity AI system 102 is in communication with one or more other devices including one or more client devices described above. It will be recognized that although the components of the target entity AI system 102 are shown to be separate in FIG. 12, any of the subcomponents may be combined into fewer components, such as into a single component, or divided into more components as may serve a particular implementation. Furthermore, although the components of FIG. 12 are described in connection with the target entity AI system 102, at least some of the components for performing operations in conjunction with the target entity AI system 102 described herein may be implemented on other devices within the environment.

The components of the target entity AI system 102 can include software, hardware, or both. For example, the components of the target entity AI system 102 can include one or more instructions stored on a computer-readable storage medium and executable by processors of one or more computing devices (e.g., the computing device 1200). When executed by the one or more processors, the computer-executable instructions of the target entity AI system 102 can cause the computing device 1200 to perform the methods described herein. Alternatively, the components of the target entity AI system 102 can comprise hardware, such as a special purpose processing device to perform a certain function or group of functions. Additionally, or alternatively, the components of the target entity AI system 102 can include a combination of computer-executable instructions and hardware.

Furthermore, the components of the target entity AI system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the target entity AI system 102 may be implemented as part of a stand-alone application on a personal computing device or a mobile device. Alternatively, or additionally, the components of the target entity AI system 102 may be implemented in any application that allows creation and delivery of marketing content to users, including, but not limited to, applications in ADOBE® EXPERIENCE MANAGER and ADVERTISING CLOUD®, such as ADOBE ANALYTICS®, ADOBE AUDIENCE MANAGER®, and MARKETO®. "ADOBE," "ADOBE EXPERIENCE MANAGER," "ADVERTISING CLOUD," "ADOBE ANALYTICS," "ADOBE AUDIENCE MANAGER," and "MARKETO" are either registered trademarks or trademarks of Adobe Inc. in the United States and/or other countries.

FIGS. 1-12 the corresponding text, and the examples provide a number of different systems, methods, and non-transitory computer readable media for determining and providing conversion activity probability scores and key personas for a target entity utilizing an artificial intelligence approach. In addition to the foregoing, embodiments can also be described in terms of flowcharts comprising acts for accomplishing a particular result. For example, FIG. 13 illustrates a flowchart of an example sequence or series of acts in accordance with one or more embodiments.

Figure 13:
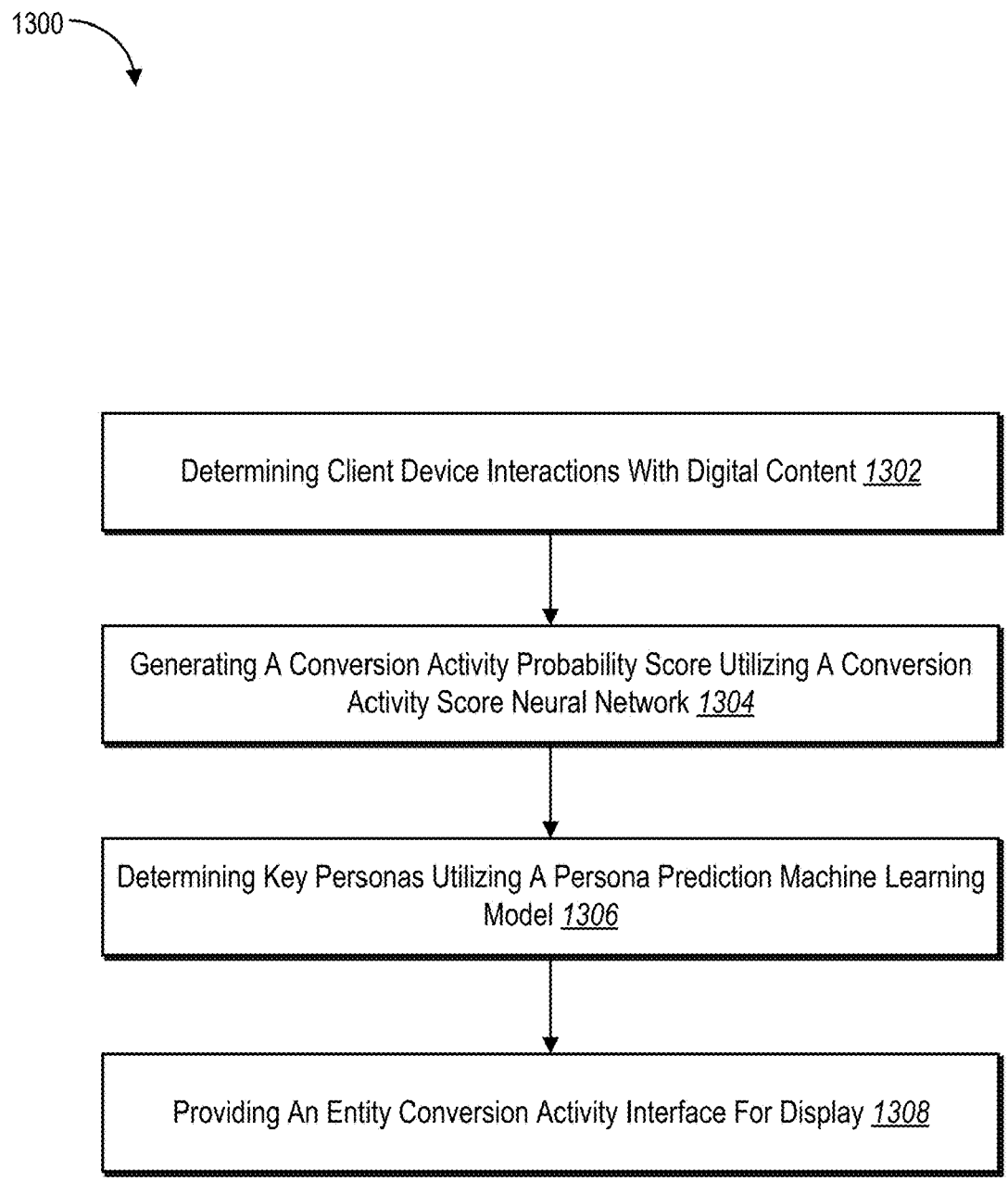
FIG. 13 illustrates a flowchart of a series of acts for determining and providing conversion activity probability scores and key personas for a target entity utilizing an artificial intelligence approach in accordance with one or more embodiments.

While FIG. 13 illustrates acts according to particular embodiments, alternative embodiments may omit, add to, reorder, and/or modify any of the acts shown in FIG. 13. The acts of FIG. 13 can be performed as part of a method. Alternatively, a non-transitory computer readable medium can comprise instructions, that when executed by one or more processors, cause a computing device to perform the acts of FIG. 13. In still further embodiments, a system can perform the acts of FIG. 13. Additionally, the acts described herein may be repeated or performed in parallel with one another or in parallel with different instances of the same or other similar acts.

FIG. 13 illustrates an example series of acts 1300 for determining and providing conversion activity probability scores and key personas for a target entity utilizing an artificial intelligence approach. In particular, the series of acts 1300 includes an act 1302 of determining client device interactions with digital content. For example, the act 1302 involves determining, for a plurality of digital profiles associated with a target entity, client device interactions with digital content provided by a digital content provider.

In addition, the series of acts 1300 includes an act 1304 of generating a conversion activity probability score utilizing a conversion activity score neural network. In particular, the act 1304 involves generating, utilizing a conversion activity score neural network and from the client device interactions of the plurality of profiles and the entity feature vector, a conversion activity probability score for the target entity relative to the digital content provider. In some cases, the series of acts includes an act of generating an entity feature vector reflecting characteristics of the target entity. For instance the act 1304 involves generating, from the entity feature vector utilizing a conversion activity score neural network, a conversion activity probability score for the target entity relative to a digital content provider indicating a probability of the target entity performing a conversion activity associated with the digital content provider.

In one or more implementations, the act 1304 involves utilizing the conversion activity score neural network to: generate, from the client device interactions utilizing an attention layer of the conversion activity score neural network, interaction vectors corresponding to client device interactions relevant to target entity decisions, generate, from the interaction vectors and the plurality of digital profiles associated with the target entity, profile vectors representing client device interactions corresponding to respective digital profiles from the plurality of digital profiles, and determine the conversion activity probability score from the profile vectors utilizing an aggregation layer of the conversion activity score neural network.

As shown, the series of acts 1300 also includes an act 1306 of determining key personas utilizing a persona prediction machine learning model. In some cases, the one or more key personas include predicted positions within the target entity for modifying digital content utilized by the target entity. For example, the act 1306 involves determining one or more key personas corresponding to the target entity from the entity feature vector utilizing a persona prediction machine learning model, the one or more key personas comprising predicted positions within the target entity for modifying digital content utilized by the target entity. In certain cases, the act 1306 involves utilizing the persona prediction machine learning model to predict, from the entity feature vector, a number of key personas for the target entity along with respective positions within the target entity associated with the number of key personas. Indeed, the act 1306 can involve utilizing the persona prediction machine learning model to predict a number of key personas associated with the target entity from the entity feature vector and to determine positions within the target entity corresponding to the number of key personas and that are relevant to target entity decisions.

In certain embodiments, the series of acts 1300 includes an act of determining digital profile characteristics for a plurality of digital profiles associated with the target entity. Further, the series of acts 1300 includes an act of determining, for the plurality of digital profiles associated with the target entity, client device interactions with digital content provided by a digital content provider and an act of selecting, according to the client device interactions and the digital profile characteristics, one or more digital profiles from among the plurality of digital profiles corresponding to the one or more key personas corresponding to the target entity.

Further, the series of acts 1300 includes an act 1308 of providing an entity conversion activity interface for display. In particular, the act 1308 involves providing, for display via an administrator device, an entity conversion activity interface associated with the target entity and including a conversion activity score element depicting a funnel stage for the target entity corresponding to the conversion activity probability score. In some embodiments, the act 1308 involves providing, for display within the entity conversion activity interface together with the conversion activity score element, a key persona element depicting the one or more key personas corresponding to the target entity. In certain embodiments, the act 1308 involves providing, for display via an administrator device, an entity conversion activity interface associated with the target entity and comprising a key persona element depicting the one or more key personas corresponding to the target entity.

In some cases, the act 1308 involves providing, for display within the entity conversion activity interface, an empty persona element indicating an empty key persona from among the one or more key personas that is unaffiliated with a digital profile associated with the target entity. Further, the series of acts 1300 includes an act of determining, in response to new client device interactions with digital content provided by a digital content provider, a digital profile associated with the empty key persona. In certain implementations, the series of acts 1300 also includes an act of modifying, in response to determining the digital profile to fill the empty key persona, the entity conversion activity interface to replace the empty persona element with a filled persona element depicting the digital profile as part of the key persona element. In these or other implementations, the act 1308 involves providing, for display within the entity conversion activity interface together with the key persona element, a conversion activity score element depicting the conversion activity probability score.

In one or more embodiments, the series of acts 1300 includes an act of receiving an indication of an interaction via the administrator device to access an entity journey interface associated with the target entity. For instance, receiving the indication of the interaction includes receiving an indication of a selection of an entity journey element within the entity conversion activity interface to access an entity journey interface associated with the target entity. In these or other embodiments, the series of acts 1300 includes an act of providing, for display via the administrator device in response to the interaction (e.g., the selection), the entity journey interface comprising a condition element selectable to add a condition for distributing digital content corresponding to the target entity and further comprising a content distribution element selectable to add a content distribution action to cause the digital content provider to distribute digital content corresponding to the target entity upon satisfaction of the condition.

In some cases, the series of acts 1300 includes acts of receiving an indication of user selection of the condition element to add the condition including an empty key persona of the one or more key personas unaffiliated with a corresponding digital profile and, in response to determining that the one or more key personas include an empty key persona, cause the digital content provider to distribute a particular digital content item to the plurality of digital profiles for determining which digital profile belongs to the empty key persona. In these or other cases, the series of acts 1300 includes acts of receiving an indication of user selection of the condition element to add the condition comprising the conversion activity probability score satisfying a conversion activity probability threshold, and, in response to determining that conversion activity probability score satisfies the conversion activity probability threshold, provide an indicator to the digital content provider that the conversion activity probability score satisfies the conversion activity probability threshold.

In certain embodiments, the series of acts 1300 includes an act of determining, from one or more of the client device interactions or the entity feature vector reflecting characteristics of the target entity, that the condition associated with the condition element is satisfied. In some cases, the series of acts 1300 includes an act of, in response to determining that the condition is satisfied, automatically providing an indicator to the digital content provider to distribute digital content associated with the content distribution element for the target entity.

In one or more implementations, the series of acts 1300 includes an act of updating the conversion activity probability score in response to new client device interactions with digital content provided by the digital content provider. In addition, in some cases, the series of acts 1300 includes an act of determining that the updated conversion activity probability score satisfies a conversion activity probability threshold for a different funnel stage and an act of modifying, in response to determining that the updated conversion activity probability score satisfies the conversion activity probability threshold, the entity conversion activity interface to indicate the different funnel stage for the target entity within a displayed conversion activity funnel.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
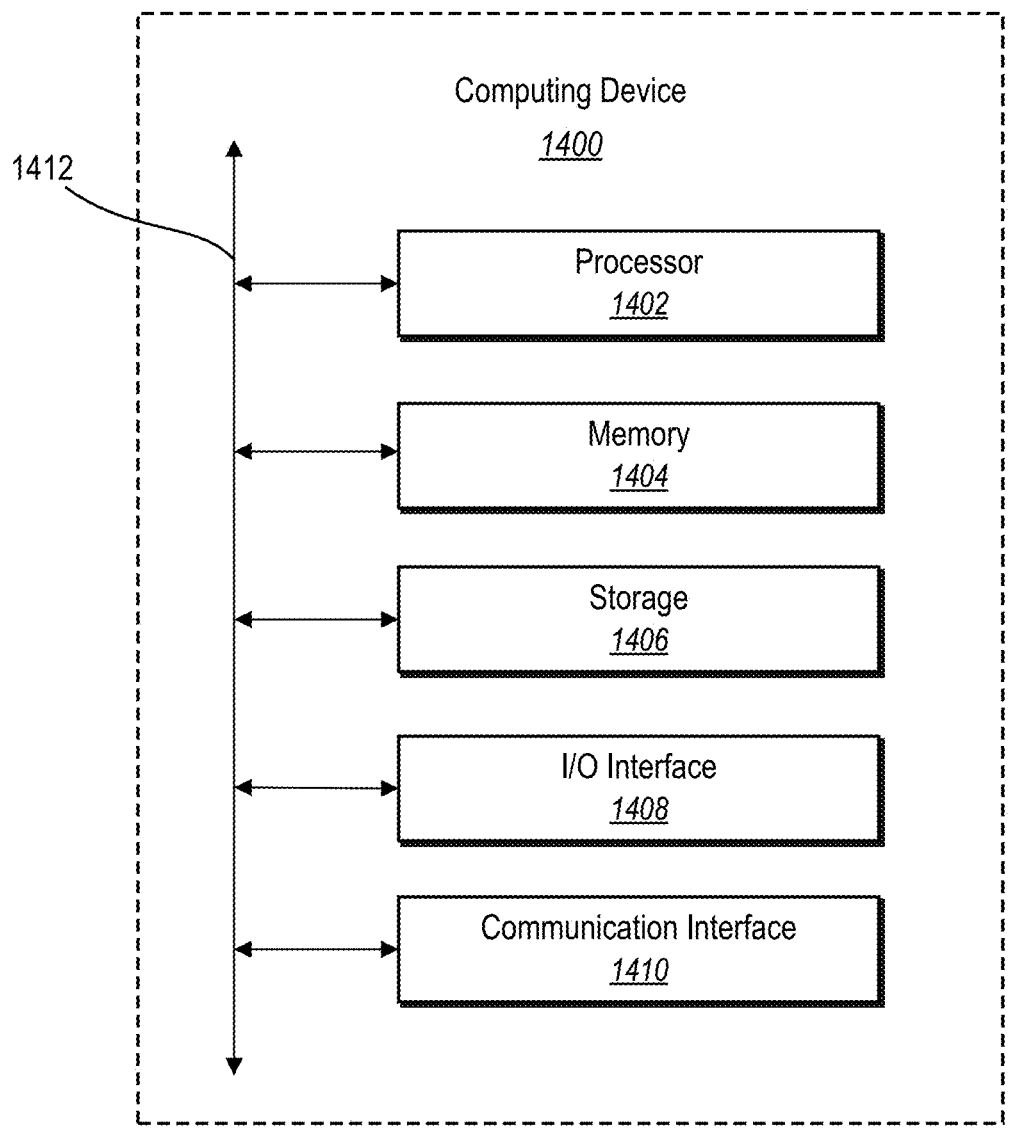
FIG. 14 illustrates a block diagram of an example computing device in accordance with one or more embodiments.

FIG. 14 illustrates, in block diagram form, an example computing device 1400 (e.g., the computing device 1200, the recipient device 108, the administrator device 116, the digital content provider system 112, and/or the server(s) 104) that may be configured to perform one or more of the processes described above. One will appreciate that the target entity AI system 102 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
   determine, for a plurality of digital profiles associated with a target entity, client device interactions with digital content provided by a digital content provider;
   generate an entity feature vector reflecting characteristics of the target entity;
   determining one or more key personas corresponding to the target entity from the entity feature vector by utilizing a persona prediction machine learning model to determine key persona scores indicating confidence that the one or more key personas represent predicted positions within the target entity having authority for modifying digital content utilized by the target entity;
   generate, utilizing a conversion activity score neural network and from the client device interactions of the plurality of digital profiles and the entity feature vector, a conversion activity probability score for the target entity relative to the digital content provider; and
   provide, for display via an administrator device, an entity conversion activity interface associated with the target entity, the entity conversion activity interface comprising:
   a key persona element depicting the one or more key personas corresponding to the target entity; and
   a conversion activity score element depicting a funnel stage for the target entity within a displayed conversion activity funnel corresponding to the conversion activity probability score.

2. The non-transitory computer readable medium of claim 1, further comprising instructions that, when executed by the at least one processor, cause the computing device to:
   receive an indication of a client device interaction via the administrator device to access an entity journey interface associated with the target entity; and
   provide, for display via the administrator device in response to the client device interaction, the entity journey interface comprising a condition element selectable to add a condition for distributing digital content corresponding to the target entity and further comprising a content distribution element selectable to add a content distribution action to cause the digital content provider to distribute digital content corresponding to the target entity upon satisfaction of the condition.

3. The non-transitory computer readable medium of claim 2, further comprising instructions that, when executed by the at least one processor, cause the computing device to:
   determine, from one or more of the client device interactions or the entity feature vector reflecting characteristics of the target entity, that the condition associated with the condition element is satisfied; and
   in response to determining that the condition is satisfied, automatically provide an indicator to the digital content provider to distribute digital content associated with the content distribution element for the target entity.

4. The non-transitory computer readable medium of claim 1, further comprising instructions that, when executed by the at least one processor, cause the computing device to generate the conversion activity probability score by utilizing the conversion activity score neural network to:
   generate, from the client device interactions utilizing an attention layer of the conversion activity score neural network, interaction vectors corresponding to client device interactions relevant to target entity decisions;

generate, from the interaction vectors and the plurality of digital profiles associated with the target entity, profile vectors representing client device interactions corresponding to respective digital profiles from the plurality of digital profiles; and determine the conversion activity probability score from the profile vectors utilizing an aggregation layer of the conversion activity score neural network.

5. The non-transitory computer readable medium of claim 1, further comprising instructions that, when executed by the at least one processor, cause the computing device to determine the one or more key personas corresponding to the target entity from the entity feature vector utilizing a persona prediction machine learning model, the one or more key personas comprising predicted positions within the target entity having authority for modifying digital content utilized by the target entity.

6. The non-transitory computer readable medium of claim 5, further comprising instructions that, when executed by the at least one processor, cause the computing device to provide, for display within the entity conversion activity interface together with the conversion activity score element, a key persona element depicting the one or more key personas corresponding to the target entity.

7. The non-transitory computer readable medium of claim 1, further comprising instructions that, when executed by the at least one processor, cause the computing device to:
generate an updated conversion activity probability score by updating the conversion activity probability score in response to new client device interactions with digital content provided by the digital content provider;
determine that the updated conversion activity probability score satisfies a conversion activity probability threshold for a different funnel stage; and
modify, in response to determining that the updated conversion activity probability score satisfies the conversion activity probability threshold, the entity conversion activity interface to indicate the different funnel stage for the target entity within a displayed conversion activity funnel.

8. A computer-implemented method comprising:
generating an entity feature vector corresponding to a target entity;
determining one or more key personas corresponding to the target entity from the entity feature vector by utilizing a persona prediction machine learning model to determine key persona scores indicating confidence that, the one or more key personas comprising represent predicted positions within the target entity having authority for modifying digital content utilized by the target entity; and
providing, for display via an administrator device, an entity conversion activity interface associated with the target entity, the entity conversion activity interface and comprising:
a key persona element depicting the one or more key personas corresponding to the target entity; and
a conversion activity score element depicting a funnel stage for the target entity within a displayed conversion activity funnel corresponding to a conversion activity probability score.

9. The computer-implemented method of claim 8, further comprising:
determining digital profile characteristics for a plurality of digital profiles associated with the target entity;
determining, for the plurality of digital profiles associated with the target entity, client device interactions with digital content provided by a digital content provider; and
selecting, according to the client device interactions and the digital profile characteristics, one or more digital profiles from among the plurality of digital profiles corresponding to the one or more key personas corresponding to the target entity.

10. The computer-implemented method of claim 8, further comprising:
providing, for display within the entity conversion activity interface, an empty persona element indicating an empty key persona from among the one or more key personas that is unaffiliated with a digital profile associated with the target entity;
determining, in response to new client device interactions with digital content provided by a digital content provider, a digital profile associated with the empty key persona; and
modifying, in response to determining the digital profile to fill the empty key persona, the entity conversion activity interface to replace the empty persona element with a filled persona element depicting the digital profile as part of the key persona element.

11. The computer-implemented method of claim 8, further comprising:
receiving an indication of a selection of an entity journey element within the entity conversion activity interface to access an entity journey interface associated with the target entity; and
providing, for display via the administrator device in response to the selection, the entity journey interface comprising a condition element selectable to add a condition for distributing digital content corresponding to the target entity and further comprising a content distribution element selectable to add a content distribution action to cause a digital content provider to distribute digital content corresponding to the target entity upon satisfaction of the condition.

12. The computer-implemented method of claim 8, further comprising generating, from the entity feature vector utilizing a conversion activity score neural network, a conversion activity probability score for the target entity relative to a digital content provider indicating a probability of the target entity performing a conversion activity associated with the digital content provider.

13. The computer-implemented method of claim 12, further comprising providing, for display within the entity conversion activity interface together with the key persona element, a conversion activity score element depicting the conversion activity probability score.

14. The computer-implemented method of claim 8, wherein determining the one or more key personas comprises utilizing the persona prediction machine learning model to predict, from the entity feature vector, a number of key personas for the target entity along with respective positions within the target entity associated with the number of key personas.

15. A system comprising:
one or more memory devices comprising a plurality of digital profiles associated with a target entity of a digital content provider, a conversion activity score neural network, and a persona prediction machine learning model; and
one or more computing devices that are configured to cause the system to:

determine, for the plurality of digital profiles associated with the target entity, client device interactions with digital content provided by the digital content provider;

generate, from the client device interactions of the plurality of digital profiles, a conversion activity probability score for the target entity relative to the digital content provider utilizing the conversion activity score neural network;

determine one or more key personas corresponding to the target entity from an entity feature vector by utilizing the persona prediction machine learning model to determine key persona scores indicating confidence that the one or more key personas represent predicted positions within the target entity having authority for modifying digital content utilized by the target entity; and provide, for display via an administrator device, an entity conversion activity interface associated with the target entity, the entity conversion activity interface comprising:
a conversion activity score element depicting the conversion activity probability score;;
a funnel stage for the target entity within a displayed conversion activity funnel corresponding to the conversion activity probability score; and
a key persona element depicting the one or more key personas corresponding to the target entity.

16. The system of claim 15, wherein the one or more computing devices are further configured to cause the system to:
receive an indication of an interaction via the administrator device to access an entity journey interface associated with the target entity; and
provide, for display via the administrator device in response to the interaction, the entity journey interface comprising a condition element selectable to add a condition for distributing digital content corresponding to the target entity and further comprising a content distribution element selectable to add a content distribution action to cause the digital content provider to distribute digital content corresponding to the target entity upon satisfaction of the condition.

17. The system of claim 16, wherein the one or more computing devices are further configured to cause the system to:
receive an indication of user selection of the condition element to add the condition comprising an empty key persona of the one or more key personas unaffiliated with a corresponding digital profile; and
in response to determining that the one or more key personas include an empty key persona, cause the digital content provider to distribute different digital content items to the plurality of digital profiles associated with the target entity.

18. The system of claim 16, wherein the one or more computing devices are further configured to cause the system to:
receive an indication of user selection of the condition element to add the condition comprising the conversion activity probability score satisfying a conversion activity probability threshold; and
in response to determining that conversion activity probability score satisfies the conversion activity probability threshold, provide an indicator to the digital content provider that the conversion activity probability score satisfies the conversion activity probability threshold.

19. The system of claim 15, wherein the one or more computing devices are further configured to cause the system to generate the conversion activity probability score by utilizing the conversion activity score neural network to:
generate, from the client device interactions utilizing an attention layer of the conversion activity score neural network, interaction vectors corresponding to client device interactions relevant to target entity decisions;
generate, from the interaction vectors and the plurality of digital profiles associated with the target entity, profile vectors representing client device interactions corresponding to respective digital profiles from the plurality of digital profiles; and
determine the conversion activity probability score from the profile vectors utilizing an aggregation layer of the conversion activity score neural network.

20. The system of claim 15, wherein the one or more computing devices are further configured to cause the system to determine one or more key personas by utilizing the persona prediction machine learning model to:
predict a number of key personas associated with the target entity from the entity feature vector; and
determine positions within the target entity corresponding to the number of key personas and that are relevant to target entity decisions.

* * * * *